United States Patent
Primerano et al.

(10) Patent No.: US 10,594,409 B2
(45) Date of Patent: Mar. 17, 2020

(54) SYSTEM FOR ULTRASONIC COMMUNICATION ACROSS CURVED METAL SURFACES

(71) Applicant: Drexel University, Philadelphia, PA (US)

(72) Inventors: Richard Anthony Primerano, Philadelphia, PA (US); Moshe Kam, Philadelphia, PA (US); Kapil R. Dandekar, Philadelphia, PA (US); Cole Gindhart, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 628 days.

(21) Appl. No.: 15/368,015

(22) Filed: Dec. 2, 2016

(65) Prior Publication Data
US 2017/0163354 A1   Jun. 8, 2017

Related U.S. Application Data

(60) Provisional application No. 62/263,213, filed on Dec. 4, 2015.

(51) Int. Cl.
*H04B 11/00* (2006.01)
(52) U.S. Cl.
CPC .................... *H04B 11/00* (2013.01)
(58) Field of Classification Search
CPC ..................................... H04B 11/00
See application file for complete search history.

(56) References Cited

U.S. PATENT DOCUMENTS

| | | | |
|---|---|---|---|
| 6,625,084 B1* | 9/2003 | Payton | H04B 11/00 367/134 |
| 7,525,398 B2* | 4/2009 | Nishimura | H04B 11/00 310/323.02 |

(Continued)

OTHER PUBLICATIONS

Aindow, A. M. et al, "Lasergenerated ultrasonic pulses at free metal surfaces," The Journal of the Acoustical Society of America, 69, 1981, pp. 1-16.

(Continued)

*Primary Examiner* — Krystine E Breier
(74) *Attorney, Agent, or Firm* — BakerHostetler

(57) ABSTRACT

Ultrasonic through metal communication systems are an effective solution for transmitting data across a metal barrier when the structural integrity of the barrier cannot be compromised by physically penetrating it. Substantial improvements in through metal communication systems have been made in recent years, enabling high speed communications of up to 15 Mbps, as well as power transmission up to 30 W across flat walls. A system is described that allows for ultrasonic through metal communication across the wall of a steel tube. Primary challenges of 1) transducer contact, 2) curvature effect on echoes, and 3) alignment are analyzed and addressed through the use of radial mode piezoelectric transducers, transducer "horns", and Electromagnetic Acoustic Transducers (EMATs). The resulting system shows no significant loss due to changes in alignment, allows for the use of either piezoelectric transducers or EMATs externally, and achieves max data rates of approximately 600 kbps without echo equalization.

7 Claims, 24 Drawing Sheets

(56) References Cited

U.S. PATENT DOCUMENTS

| | | | | |
|---|---|---|---|---|
| 7,894,306 | B2* | 2/2011 | Bagshaw | H04B 13/00 |
| | | | | 367/137 |
| 9,361,877 | B2* | 6/2016 | Antonio | G10K 11/24 |
| 9,455,791 | B2* | 9/2016 | Lawry | H04B 11/00 |
| 10,295,500 | B2* | 5/2019 | Makin | G01N 29/04 |
| 2010/0027379 | A1* | 2/2010 | Saulnier | G08C 23/02 |
| | | | | 367/137 |
| 2017/0248009 | A1* | 8/2017 | Fripp | E21B 34/066 |

OTHER PUBLICATIONS

Auld, B.A., "Acoustic Fields and Waves in Solids", vol. II, New York, NY: John Wiley & Sons Inc., 1973, ch. 9, sec. D, pp. 1-4.

Benson, B.; et al., "Design of a low-cost, underwater acoustic modem for short-range sensor networks," OCEANS 2010 IEEE—Sydney, vol. 1, No. 9, 2010, pp. 1-9.

Bielinski, M. et al., "Application of Adaptive OFDM Bit Loading for High Data Rate Through-Metal Communication," Global Telecommunications Conference (GLOBECOM 2011), 2011 IEEE, vol. 1, No. 5, 2011, pp. 1-5.

Bielinski, M. et al., "Bit-Loaded PAPR Reduction for High-Data-Rate Through-Metal Control Network Applications" Industrial Electronics, IEEE Transactions on, vol. 61, No. 5, 2014, pp. 2362-2369.

Da Cunha, M.P. et al., "Improved longitudinal EMAT transducer for elastic constant extraction," Frequency Control Symposium and Exposition, 2005. Proceedings of the 2005 IEEE International, vol., No., 2005, pp. 426,432.

David, J.. et al., "Fundamentals and Applications of Ultrasonic Waves" Washington,DC: CRC Press, 2002, 451 pages.

Graham, D.J. et al., "High bit rate communication through metallic structures using electromagnetic acoustic transducers," OCEANS 2009—Europe, vol., No., 2009, pp. 1,6.

Hobart, E. et al., "Acoustic modem unit," OCEANS 2000 MTS/IEEE Conference and Exhibition, vol. 2, 2000, pp. 769,772.

Hu, Y. et al., "Transmitting electric energy through a metal wall by acoustic waves using piezoelectric transducers," Ultrasonics, Ferroelectrics, and Frequency Control, IEEE Transactions on, vol. 50, No. 7, 2003, pp. 773,781.

Lawry, T. "A high Performance System for Wireless Transmission of Power and Data through Solid Metal Enclosures," Ph.D. dissertation, Dept. Elect. Eng., Rensselaer Polytechnic Institute, Troy, NY, 2011, 185 pages.

Mason, W.P., "Physical Acoustics and the Properties of Solids", New York, NY: D. Van Nostand Co. Inc, 1958, ch. 1-3, pp. 1-21.

Primerano, R. "High Bit-rate Digital Communication through Metal Channels," Ph.D. Dissertation, ECE Dept., Drexel University, Philadelphia, PA, 2010, 1-149.

Primerano, R. et al. "Echo-Cancellation for Ultrasonic Data Transmission through a Metal Channel," Information Sciences and System, 2007. CISS '07. $41^{st}$ Annual Conference on, vol., No., 2007, pp. 1-5.

Primerano, R. et al., "High bit rate ultrasonic communication through metal channels," Information Sciences and Systems, 2009. CISS 2009. 43rd Annual Conference on, vol., No., 2009, pp. 902,906.

Saulnier, G.J. et al., "PIG-4 Through-Wall Communication of Low-Rate Digital Data Using Ultrasound," Ultrasonics Symposium, 2006. IEEE, vol. 2, No. 6, 2006, pp. 1-7.

Sherrit, et al., "Efficient electromechanical network model for wireless acoustic-electric feed-throughs," Proc. SPIE 5758, Smart Structures and Materials 2005: Smart Sensor Technology and Measurement Systems, 2005, 12 pages.

Shoudy, D. A; et al., "P3F-5 An Ultrasonic Through-Wall Communication System with Power Harvesting," Ultrasonics Symposium, 2007. IEEE, vol. 28, No. 31, 2007, pp. 1848,1853.

Wanuga, K. et al., "High-data-rate ultrasonic through-metal communication," Ultrasonics, Ferroelectrics, and Frequency Control, IEEE Transactions on, vol. 59, No. 9, 2012 pp. 2051,2053.

\* cited by examiner

SYSTEM FOR ULTRASONIC COMMUNICATION ACROSS CURVED METAL SURFACES

CROSS-REFERENCE TO RELATED APPLICATIONS

The present application claims priority to U.S. Provisional Patent Application No. 62/263,213, filed Dec. 4, 2015. The content of that application is herein incorporated by reference in its entirety.

GOVERNMENT RIGHTS

This invention was made with government support under Contract Nos. CNS-0854946 and CNS-0923003 awarded by the National Science Foundation and DAAB07-01-9-L504 awarded by the U.S. Army. The government has certain rights in the invention.

TECHNICAL FIELD

The present invention relates to ultrasonic communications systems and, more particularly, to systems for communicating signals across cylindrical metal walls and other curved metal surfaces.

BACKGROUND

With the increasing reliability of wireless systems, many industries are opting to replace old hardwired systems with wireless ones. Wireless systems offer lower cost, higher flexibility systems that can be deployed in some applications where wired systems would be too cumbersome. Despite the benefits of wireless systems, their deployment in industrial environments can be difficult. A high number of metal barriers such as walls, metal containers and pipes can block wireless signals from their intended paths. In some cases, these barriers can be avoided by using repeaters mounted on either side of the barrier with a hardwire connection passing through the barrier. However, in some cases the option to penetrate the metal barrier, or route wire around it, is not viable.

In these select cases, ultrasonic through metal communication can be utilized to transmit through the barrier. Using ultrasonic transducers, the systems turn the barriers themselves into communication channels. Prior work in this area has developed ultrasonic through metal communications systems that can transmit at data rates up to 15 Mbps, as well as some systems that can transmit over 30 W of power through metal barriers, but these systems are limited in their application. Prior work in ultrasonic through metal communication has focused on transmission across flat metal barriers, with transducers that are well aligned and bonded to the barrier.

The present invention relates to the design and development of an ultrasonic through metal communication system that can be deployed on cylindrical metal walls. In industrial environments, there are many situations where through metal communication may be desirable across non-flat barriers such as pipes or the walls of pressure vessels. The curvature of these barriers presents a number of challenges that affect not only the physical development of the system, but also the development of the communication schemes. The present invention provides an ultrasonic through metal communication system that is capable of transmitting data across a curved barrier. By identifying and studying the most significant challenges in transmission across curved systems, the system described herein is capable of achieving a 1 kbps data rate at minimum and provides a base understanding of the problems curved barriers present. This will allow for the advancements from prior work to be adapted to this system for transmission across curved systems.

Initial work on through metal communications began in the year 2000 with the development and testing of the "HullCom" Acoustic Modem Unit by Hobart et al. in "Acoustic modem unit," OCEANS 2000 MTS/IEEE Conference and Exhibition, vol. 2, pp. 769-772, 2000. The HullCom system was developed for use on Volunteer Observer Ships collecting Seas Surface Temperature data for the National Oceanic and Atmospheric Administration. The device was utilized to transmit temperature readings across the hull of the ship from a thermosalinograph at the base of the hull, to the main bridge at the top of the ship. Due to the incredibly low sampling rate, there was no need for high-speed communication and the maximum verified data rate achieved by Hobart et al, was 20 symbols per second.

The HullCom system communicated data from within a sealed box and had a relatively high power requirement, which presented a challenge for maintaining the internal system. In order to simplify the challenge of powering a transducer within a sealed container, techniques for power transmission via ultrasonic waves were explored by a team of researchers at University of Nebraska lead by Dr. Yuantai Hu as described by Hu et al. in "Transmitting electric energy through a metal wall by acoustic waves using piezoelectric transducers," Ultrasonics, Ferroelectrics, and Frequency Control, IEEE Transactions on, vol. 50, no. 7, pp. 773-781, July 2003. Here, a general mathematical model was developed for assessing the feasibility and efficiency of transmitting energy through a metal wall via ultrasonic waves. This model considered two identical piezoelectric transducers mounted on opposite sides of a flat metallic barrier. The work concluded that it is possible to transmit electrical power through a metal barrier utilizing thickness mode piezoelectric transducers. The most interesting result from this research was that the maximum power transmission efficiency is not achieved at the fundamental resonant frequency of the system, but rather at one of the higher harmonic frequencies. The exact harmonic with the maximum efficiency is not constant across all systems, but varies based on an assortment of system parameters.

In 2005, a team of researchers from the California Institute of Technology expanded on the work done by Hu et al. and developed a general network model for "Wireless Acoustic Electric Feed-troughs" (Sherrit et al., "Efficient electromechanical network model for wireless acoustic-electric feed-throughs," Proc. SPIE 5758, Smart Structures and Materials 2005: Smart Sensor Technology and Measurement Systems, 362 (May 20, 2005)). Sherrit et al. took the pure mathematical model developed by Hu et al. and created a network equivalent circuit model. The network model not only allows for more accurate and realistic results by considering all of the mechanics and real world loss of the system, but also allows for future work to be done by considering connections to additional networked circuits. Sherrit et al. completed calculations with their model for a variety of transducer parameters, and their work followed the same trends initially observed by Hu et al.

In 2006, a team at Rensselaer Polytechnic Institute worked to apply the theory developed by Hu and Sherrit (see Saulnier et al., "P1G-4 Through-Wall Communication of Low-Rate Digital Data Using Ultrasound," Ultrasonics Symposium, 2006, IEEE, pp. 1385-1389, vol. 2, no. 6, October 2006). The team experimented with three different physical system layouts/communication methods for transmission through a 15.4 cm thick steel barrier. The first method, which was named the "Double-Hop Approach", utilized a total of four transducers with a designated Transmit and Receive transducer on each side of the barrier. The second method, called the "Reflected Pulse Approach", utilized a single pair of transducers mounted on opposite sides of the wall. The external transducer communicated by generating pulses, while the internal transducer communicated by altering its impedance to attenuate the reflected signal. The third method, called the "Hybrid Approach", fused the previous two methods. Two transducers were utilized externally, one designated for transmit and the other for receive, while a single internal transducer communicated by attenuating the reflected signal. Utilizing a simple PAM sinusoid with the "Hybrid Approach", Saulnier et al. successfully achieved 2-way communication with a maximum data rate of approximately 500 bps. At this limit the echoes within the metal barrier begin to create significant ISI.

Further work at Rensselaer Polytechnic Institute focused on the use of power harvesting in an ultrasonic communication system. In 2007, Shoudy et al. published a paper entitled "P3F-5 An Ultrasonic Through-Wall Communication System with Power Harvesting," Ultrasonics Symposium, 2007. IEEE, pp. 1848-1853, vol. 28, no. 31, October 2007) discussing the details of a communication system that transmitted at 55 kbps with power transmission of over 0.25 W. This system utilized the "Reflected Pulse Approach" discussed by Saulnier et al., which involves two transducers mounted directly opposite each other on a metal barrier. The external transducer is powered directly and is an active system, while the internal transducer is passive and must be powered through ultrasonic energy before communication can occur. Utilizing a voltage doubling rectifying circuit, the internal transducer collects and stores energy from continuous wave (CW) transmissions until the system can start up. Once the system is fully powered, the internal transducer transmits data by adjusting its impedance and attenuating the reflected signal, which is then read by the external transducer. The maximum data rate of 55 kbps achieved in this paper is directly limited by the echoes created within the metal channel, which cause significant ISI.

The continuous echoes within the metal channel were the limiting factor in data rate for Saulnier et al., and are the most significant challenge to overcome for reliable through metal communication. In 2007, a team at Drexel University developed a method for reducing interference from echoes (Primerano et al., "Echo-Cancellation for Ultrasonic Data Transmission through a Metal Channel," Information Sciences and Systems, 2007. CISS '07. 41st Annual Conference on, vol. 14, no. 16, pp. 841-845, March 2007. Utilizing a pair of transducers mounted directly opposite each other on a flat metal barrier, Primerano et al., developed a pre-distortion filter to significantly reduce the effect of echoes in the metal channel. Utilizing narrow pulses to encode data with a simple on-off keying (OOK) scheme, a maximum data rate of 50 kbs was achieved before ISI caused by echoes became too great. Through the development of a simplified system model, Primerano et al. created a pre-distortion filter that utilized a negative pulse to attenuate the echoes. This method and simple OOK modulation scheme allowed for a maximum data rate of over 1 Mbps.

Continuing work at Drexel University focused on the development of more sophisticated data modulation schema, while continuing to work with the same physical system consisting of two identical piezoelectric transducers, precisely aligned and securely mounted on opposite sides of a ¼" steel barrier. Proper preparation of the metal surface ensures no rust and minimal surface contamination, while a layer of coupling gel is utilized to allow for more efficient energy transmission from the transducer to the metal barrier. Using this same physical system, Primerano et al. developed a better system model and pre-distortion filter (Primerano et al., "High bit rate ultrasonic communication through metal channels," Information Sciences and Systems, 2009, CISS 2009. 43rd Annual Conference on, vol. 18, no. 20, pp. 902-906, March 2009), explored the use of OFDM (Primerano, R. "High Bit-rate Data Digital Communication through Metal Channels," Ph.D. dissertation, ECE Dept., Drexel University, Philadelphia, Pa., 2010; Bielinski et al., "Application of Adaptive OFDM Bit Loading for High Data Rate Through-Metal Communication," Global Telecommunications Conference (GLOBECOM 2011), 2011 IEEE, vol. 5, no. 9, pp. 1-5, December 2011; and Wanuga et al., "High-data-rate ultrasonic through-metal communication," Ultrasonics, Ferroelectrics, and Frequency Control, IEEE Transactions on, vol. 59, no. 9, pp. 2051-2053, September 2012), and advanced bit loading algorithms (Bielinski et al., "Bit-Loaded PAPR Reduction for High-Data-Rate Through-Metal Control Network Applications," Industrial Electronics, IEEE Transactions on, vol. 61, no. 5, pp. 2362-2369, May 2014) to achieve data rates up to 15 Mbps.

Further research at Rensselaer Polytechnic Institute resulted in a system that is capable of transmitting both data and power simultaneously. The final system was capable of transmitting data at a maximum rate of 12.4 Mbps while simultaneously transferring 32.5 W of AC power through a 6.3 cm block of steel (Lawry, "A high Performance System for Wireless Transmission of Power and Data through Solid Metal Enclosures," Ph.D. dissertation, Dept. Elect. Eng., Rensselaer Polytechnic Institute, Troy, N.Y., 2011).

These papers represent significant advancements in the capabilities of ultrasonic through metal communication systems in the past 14 years. However, this prior research has only considered ultrasonic through metal transmission across flat metal barriers with piezoelectric transducers that are securely mounted to cleaned and prepared surfaces. In considering applications of through metal communication in industrial environments, there can be additional physical obstacles such as curved surfaces, inability to securely mount transducers, non-clean surfaces, etc. The focus of the present invention is on the development of an ultrasonic though metal communication system that can be utilized to transmit data across cylindrical metal walls.

Types of Piezoelectric Transducers and Transmission Methods

In looking to design a through-metal transmission system that can handle these non-ideal physical conditions, a variety of transmission methods were considered. These methods were based on the types of commercially available piezoelectric transducers. Piezoelectric transducers can be purchased from a variety of companies such as Steiner & Martins Inc. and APC International (Steiner and Martins, Inc., http://steminc.com; APC International, Ltd., https://www.americanpiezo.com), and are primarily used for non-destructive testing (NDT). Piezoelectric transducers are designed in a variety of shapes that each allow for excitation of different modes of acoustic wave propagation, which each have their own advantage for NDT. However, for the purposes of through metal communication, only three primary transducer types were considered in this project: Longitudinal mode, Shear mode, and Radial mode.

Longitudinal Mode

The first piezoelectric transducer type considered was longitudinal mode. Longitudinal mode transducers (FIG. 1) are the standard type of transducer used in most of the systems tested in the prior art. These transducers work by expanding and contracting through their thickness, normal to the metal barrier. This expansion and contraction generates compression waves that travel through the thickness of the metal.

Shear Mode

The second type of piezoelectric transducer considered was shear mode. These transducers (FIG. 2) expand and contract through their width, parallel to the metal barrier. This creates compression waves that travel along the surface and near surface depth of the barrier, as well as shear mode acoustic waves that travel through the barrier.

Radial Mode

The final type of piezoelectric transducer considered was radial mode. These are cylindrical transducers (FIG. 3) that expand and contract through their radius. This type of transducer has been utilized previously for underwater communication systems (Benson et al., "Design of a low-cost, underwater acoustic modem for short-range sensor networks," OCEANS 2010 IEEE—Sydney, vol. 24, no. 27, pp. 1-9, May 2010). These ring transducers can be utilized to transmit waves through or along the surface of a barrier depending on how they are applied. These transducers also have the added benefit of a 360° transmission envelope, as opposed to the narrow directional transmission envelopes created by the other transducer types.

Each of these transducer types and the waves they generate have strengths and weaknesses based on the situation. Each must be given consideration in the development of a through metal communication system in order to develop the optimal set up. All three types are commercially available in a variety of common sizes, and can be custom ordered to fit the needs of a given system.

The most recent work on through metal communication noted above has focused primarily on increasing the maximum data rate of communication systems. While utilizing this common physical test bed of two identical transducers securely mounted on opposite sides of a flat metal barrier, recent focus has been on the development of more accurate system models and filters, the use of advanced modulation schemes such as OFDM, and different bit loading algorithms. In order to make ultrasonic through metal communication feasible across a wider array of industrial environments, efforts must be made to develop alternate physical layouts. In the present invention, an ultrasonic through metal communication system was developed that allows for communication across cylindrical metal walls.

Transmission across curved barriers presents a number of physical challenges that have not been considered in previous experiments. While the prior work by Lawry (noted above) cites transmission across a "slightly curved" metal barrier, there is no discussion by Lawry of the radius of curvature or any effects this had on his work, and is therefore presumed to be negligible. This work aims to explore transmission through surfaces with non-negligible curvature. Possible uses for this technology in industry include transmission through pipes or the curved surfaces of tanks and pressure vessels. In order to develop such a system there are three primary physical challenges that must be overcome: contact, curvature, and alignment.

Transducer Contact

The initial difficulty in deploying a through metal communication system on a curved barrier comes in the mounting of the transducers themselves. If attempting to utilize a flat longitudinal mode transducer on a curved surface, there would only be a single point of tangential contact externally, and two points of contact along the edge of the transducer internally (FIG. 4). This minor contact would not lend itself to a reliable communication system, so greater contact must somehow be established. The simplest solution to this problem would be to alter the geometry of the barrier to create two flat surfaces for mounting as shown in FIG. 4.

The primary drawback from this simple solution is that it requires manufacturing changes to the barrier, and in some cases this may not be possible or cost effective. Therefore, the inventors seek to develop a system that will allow for communication through a curved surface without need to significantly alter the geometry of the barrier.

Due to the challenges of getting proper transducer contact on a curved surface, the inventors have developed a system that does not require surface preparation or bonding of the transducers to the barrier. Current systems require cleaning and preparation of the barrier's surface, and solid mounting of the transducers with epoxy and coupling gel. In some industrial applications, this process may be cumbersome, or even impossible, due to factors such as rust, surface contaminants, or irregularities in the contour of the barrier. The ability to transmit without direct surface contact, or at least with non-bonded contact, would allow for ultrasonic through metal solutions in these non-ideal situations.

In looking for non-contact transmission methods, two alternatives were identified. The first option is the use of a laser for the creation of ultrasound waves. This method was first utilized in 1981 when researchers at the University of Hull in England explored the use of a Q-switched Nd:YAG laser to excite various ultrasonic wave modes for NDT applications in 1981 (Aindow et al., "Laser-generated ultrasonic pulses at free metal surfaces," The Journal of the Acoustical Society of America, 69, 449-455 (1981)). This work successfully demonstrated the production of longitudinal, shear, and surface waves in a variety of metals using the laser, with no visible damage to the metal. While this method may be very effective and efficient in non-destructive testing, it would be impractical for most applications of through-metal communication. The development, installment and maintenance of a laser would be too involved for most through metal communication systems. Additionally, although the laser has the benefit of requiring no bonding to the barrier, it would still require significant surface preparation as the laser suffers losses in efficiency if the metal surface is not free from contamination.

A second option is the use of Electromagnetic Acoustic Transducers (EMATs). In 2009, Graham et al. at Newcastle University demonstrated the use of EMATS for successful ultrasonic through metal communication (Graham et al., "High bit rate communication through metallic structures using electromagnetic acoustic transducers," OCEANS 2009—EUROPE, vol. 11, no. 14, pp. 1-6, May 2009). Utilizing two identical EMATs where each was held 0.8 mm from the surface of the barrier, Graham et al. were able to achieve a raw symbol rate of up to 40 ksps, which was improved to 1 Mbps with the application of a quadrature amplitude modulation (QAM) scheme. This presents a much more attractive solution since EMATs are significantly cheaper and easier to work with than lasers, and do not suffer the same efficiency losses from surface contamination.

Curvature/Echoes

The second challenge to overcome is the curvature of the barrier, and the effects it will have on the ultrasonic waves. The primary limiting factor on data transmission rates in through metal systems is the echoes, and the curvature of the surface has a significant effect on the propagation of echoes within the barrier. In order to develop an effective high-speed communication system, the echoes must be understood, and their effects mitigated. In order to understand how the curvature of the barrier effects the echoes in the system, an overview of acoustic echoes is presented below, and a series of acoustic simulations were completed, the results of which can be seen below as well.

Transducer Alignment

The final physical challenge addressed in accordance with the invention is the issue of alignment. When working with curved surfaces, especially on pipes and small pressure vessels, it may be difficult to guarantee proper alignment when installing through metal communication systems. As such it is important to understand the effects that transducer misalignment has on the system, and attempt to mitigate any negative effects. One way to do this is through the use of a hybrid communication system. In all of the prior work discussed thus far, a uniform pair of transducers has been used for data transmission. However, this may not always be the ideal system. In some applications, it may be impossible to align two longitudinal mode transducers across from each other, so it may be advantageous to utilize a longitudinal mode and shear mode transducer aligned orthogonally to each other. Or it may be preferable to have a securely mounted piezoelectric on the internal surface of a pressure vessel while using a non-bounded transducer such as an EMAT externally.

These three challenges are what makes transmission through a curved surface unique when compared with transmission across flat barriers. If these challenges can be appropriately addressed, the advancements made in prior research of through metal communications should be easily applicable to curved barriers.

SUMMARY

The invention addresses the above-mentioned and other challenges in the art by providing a system for ultrasonic communication across curved metal surface having acoustic transducers on opposing sides of a curved metal surface having a convex side and a concave side. The acoustic transducers include a first acoustic transducer on a concave side of the curved metal surface comprises at least one curved radial mode transducer adapted to mate with the concave surface of the curved metal surface, and a second acoustic transducer on a convex side of the curved metal surface. The system also includes a transducer horn adapted to hold the second acoustic transducer in place against the convex side of the curved metal surface. The system also includes a data modulator that applies modulated data bits to one of the first and second acoustic transducers for transmission of the modulated data bits through the curved metal surface and for receipt of the modulated data bits by the other of the first and second acoustic transducers that have been transmitted through the curved metal surface, and a demodulator that demodulates the data bits received by the other of the first and second acoustic transducers.

In exemplary embodiments, the first acoustic transducer comprises a piezoelectric transducer and the second acoustic transducer comprises an electromagnetic acoustic transducer adapted to provide non-contact communication with the curved metal surface. The electromagnetic acoustic transducer may comprise, for example, a plurality of magnetized rings, a single axially magnetized rod, and a pancake coil between the ring and the rod. In exemplary embodiments, the transducer horn is made of plastic.

In exemplary embodiments, the modulated data signal received by the second acoustic transducer has a sinusoidal waveform with decreasing magnitude. Also, the data modulator may apply an on-off keying scheme with an impulse train to the data bits. In exemplary configurations, the impulse train includes a series of 5 µs impulses at a start of each data bit. The on-off keying scheme also may comprise 56 ns impulses at an 18 MHz resonant frequency.

These and other characteristic features of the invention will be apparent to those skilled in the art from the following detailed description.

BRIEF DESCRIPTION OF THE DRAWINGS

Exemplary embodiments of the invention will be described in conjunction with the associated figures, of which.

DETAILED DESCRIPTION OF THE INVENTION

Certain specific details are set forth in the following description with respect to FIGS. 4-43 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Setup

A sealed metal vessel (FIG. 5) was used as the barrier for all testing. The vessel is made of 4340 Steel and measures approximately 55 mm in height, and 48 mm in diameter. The internal diameter of the vessel was machined to match the diameter of the selected internal transducer, resulting in a final barrier thickness of approximately 12 mm.

The piezoelectric transducers selected for use in this system (FIG. 6) are radial mode cylinder transducers, Part Number SMC26D22H13111, purchased from Steiner & Martins Inc. The transducers measure 26 mm outer diameter, 22 mm inner diameter, and 13 mm in height.

Figure 1:
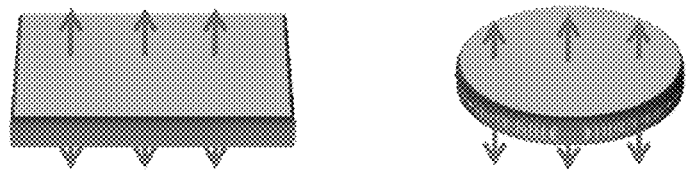
FIG. 1 illustrates the direction of expansion/contraction on conventional longitudinal mode transducers.
Figure 2:
FIG. 2 illustrates direction of expansion/contraction on conventional shear mode transducers.
Figure 3:
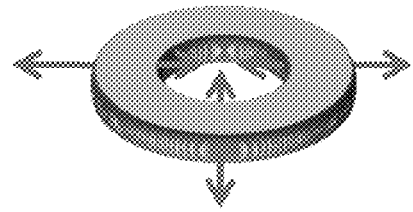
FIG. 3 illustrates direction of expansion/contraction on conventional radial mode transducers.
Figure 4:
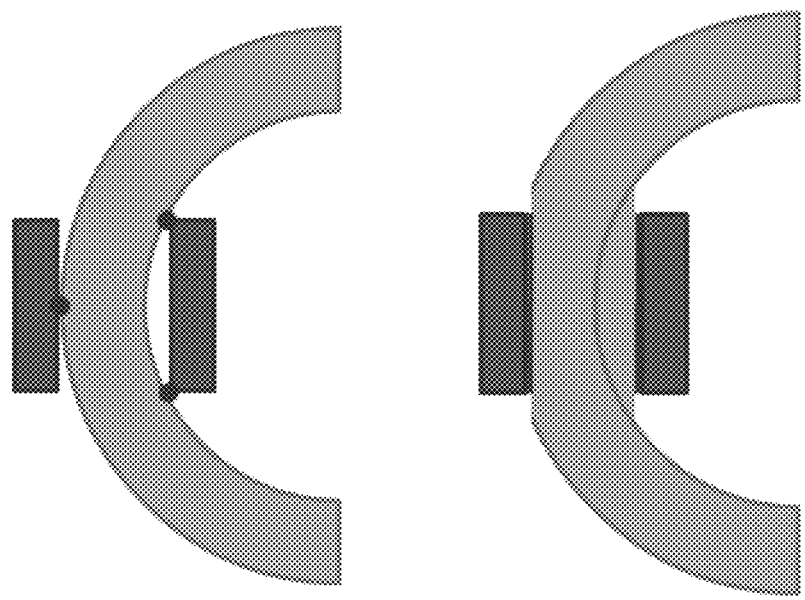
FIG. 4 illustrates transducer contact with unmodified curved barrier (left) and modified barrier (right).
Figure 5:
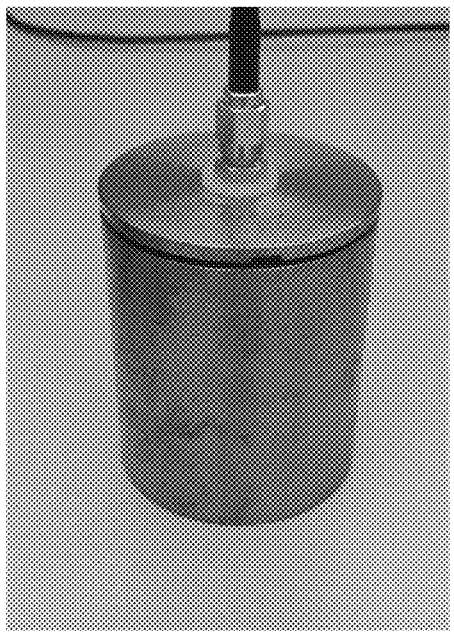
FIG. 5 illustrates a test vessel used in an exemplary embodiment.
Figure 6:
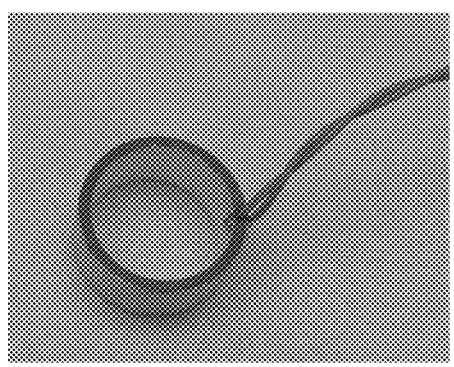
FIG. 6 illustrates a radial mode transducer used in an exemplary embodiment.
Figure 7:
FIG. 7 illustrates matching internal and external transducers in an exemplary embodiment.

The radial mode cylindrical transducers were selected specifically for use as the internal, receiving transducer. For simplicity, an identical cylindrical transducer was used externally for initial proof of concept work. The internal and external transducers were matched (FIG. 7).

Figure 8:
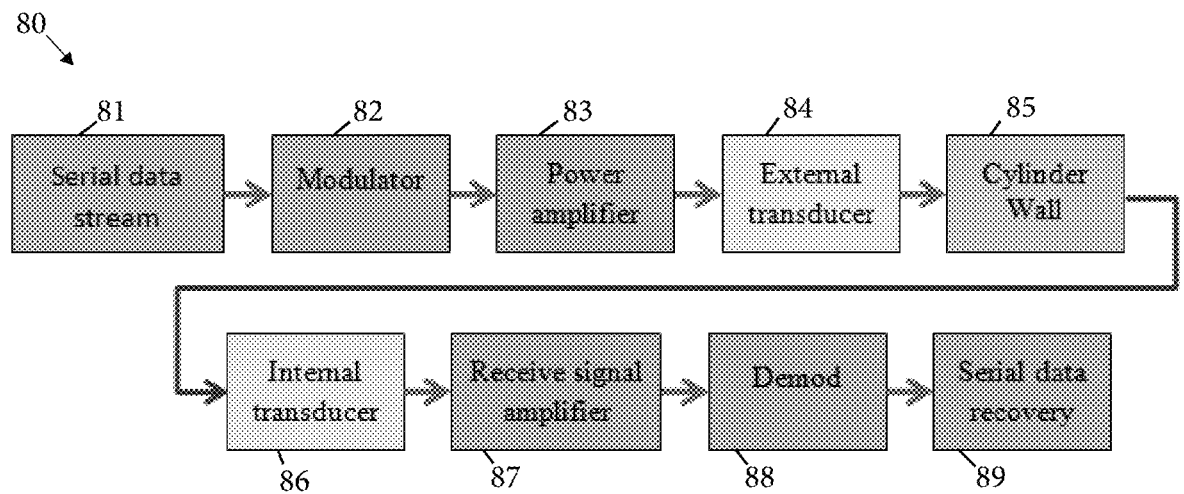
FIG. 8 illustrates a complete system model as a flow chart.
Figure 9:
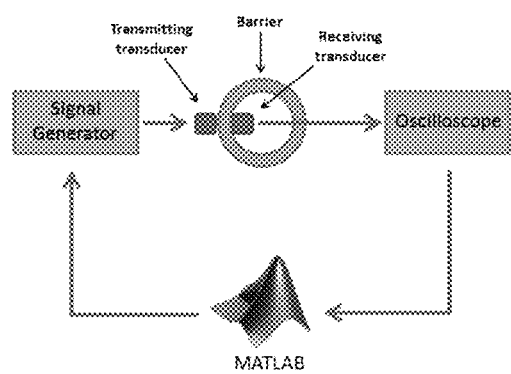
FIG. 9 illustrates a complete test system with Matlab as the start and end point in an exemplary embodiment.

The complete system 80, as illustrated in FIG. 8, includes a serial data stream 81, which is then modulated by modulator 82 and passed through a power amplifier 83 to the external transducer 84 before being transmitted through the metal barrier 85. The internal transducer 86 receives the data, passes it through a receive signal amplifier 87 and demodulator 88 where the serial data 89 is recovered.

In an exemplary embodiment, the data modulation and amplification were performed by an Agilent 33250A Waveform generator connected directly to the external transducer 84. On the receive side, data acquisition was completed using an Agilent Infinium 54833A Oscilloscope. Both the waveform generator and oscilloscope were remotely controlled via Matlab (FIG. 9), which was utilized for all serial data generation, demodulation, recovery and analysis. Transmit and receive amplifiers were unnecessary for initial testing due to the sensitivity of the oscilloscope.

Echo Analysis

One of the most significant challenges in developing high speed through metal communication is dealing with the high multipath nature of a metallic channel. Without proper equalization, acoustic echoes within the channel cause significant ISI and restrict the maximum data rate. Through modeling and study of the echoes within flat walls, effective equalization techniques have been developed that allow for significant increases in symbol rate, from 50 ksps to over 1 Msps (see Primerano et al., "Echo-Cancellation for Ultrasonic Data Transmission through a Metal Channel," Information Sciences and Systems, 2007, CISS '07, 41st Annual Conference on, vol. 14, no. 16, pp. 841-845, March 2007).

In order to create comparable echo equalization methods for cylindrical wall transmission, the echoes must be well understood. To properly understand these echoes, a basic understanding of acoustic reflection, transmission, and refraction phenomena must be developed. Since the inventors are primarily interested in the echoes within a metal channel, in this case specifically 4340 steel, the inventors will only consider the equations governing the reflection, transmission and refraction of acoustic waves in isotropic solids.

Acoustic Reflection

The inventors first considered the case of reflections of acoustic waves at a free plane boundary. A free boundary is defined as the interface of a given medium and a vacuum. Since acoustic waves cannot exist in a vacuum, all of the energy is reflected, and there is no need to consider transition or refraction.

Longitudinal Waves

Figure 10:
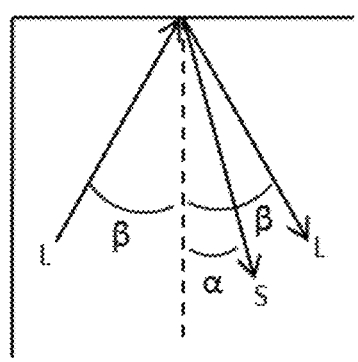
FIG. 10 illustrates reflection of a longitudinal mode wave on a free boundary.

For any given isotropic solid, there are typically two different wave velocities for each propagation mode. The result of these two different wave velocities results in birefringence, the generation of two different mode reflected waves. So, when a longitudinal mode wave intersects with a free boundary at an oblique angle, it generates not only a reflected longitudinal mode wave, but a shear mode reflection as well (FIG. 10).

The geometric relationship of the incident and reflected waves is governed by Snell's law:

$$\frac{\sin\alpha}{V_s} = \frac{\sin\beta}{V_l} \qquad (1)$$

Where α is the angle of the reflected shear wave, β is the angle of the incident and reflected longitudinal mode waves, and $V_l$ and $V_s$ are the longitudinal mode and shear mode wave velocities of the material.

The amplitude of the reflected waves are a function of the angle of incidence and Poisson's Ratio for the given material and can be determined by the following equations:

$$2(A_i - A_l)\sin\alpha\cos\beta - A_s\cos 2\alpha = 0 \tag{2a}$$

$$(A_i + A_l)\sin\beta\cos 2\alpha - A_s\sin\alpha\sin 2\alpha = 0 \tag{2b}$$

where $A_i$, $A_l$, and $A_s$ are the amplitudes of the incident wave, reflected longitudinal wave and reflected shear wave.

Shear Waves

If one now considers the reflection of shear waves, there are two separate cases to study—reflections from a surface parallel to the direction of particle motion, and reflection from a surface that is not parallel to the direction of particle motion.

Figure 11:
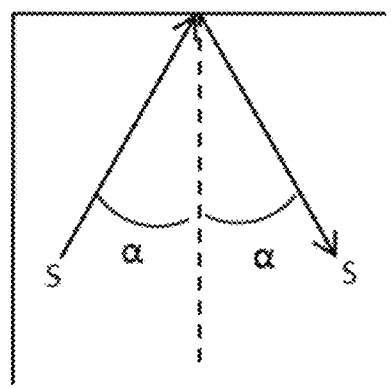
FIG. 11 illustrates reflection of a shear mode wave on a free plane boundary that is parallel to the particle motion.

The first case is the simpler one. When a shear wave intersects with a free boundary whose surface is parallel to the particle motion no birefringence occurs. The shear wave generates a single shear mode reflection, whose angle and amplitude are identical to that of the incident wave (FIG. 11).

Figure 12:
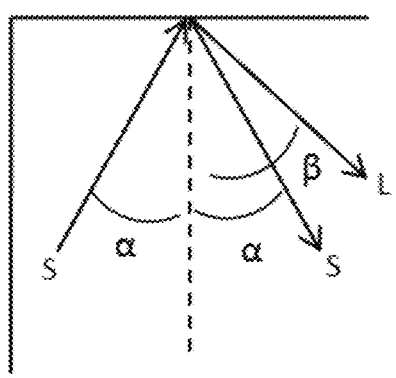
FIG. 12 illustrates reflection of a shear mode wave on a free plane boundary that is not parallel to the particle motion.

The second case is comparable to reflection of a longitudinal wave. When a shear wave intersects with a free boundary whose surface is not parallel to the particle motion birefringence occurs, and two reflected waves are generated (FIG. 12).

The geometric relationship of the incident and reflected waves is again governed by Snell's law, $$\frac{\sin\alpha}{V_s} = \frac{\sin\beta}{V_l} \tag{3}$$

and the amplitude of the waves are governed by a set of equations similar to those used for an incident longitudinal wave:

$$(B_i - B_s)\cos 2\alpha - 2B_l\sin\alpha\cos\beta = 0 \tag{4a}$$

$$(B_i + B_s)\sin\alpha\sin 2\alpha - B_l\sin\beta\cos 2\alpha = 0 \tag{4b}$$

where α is the angle of the incident and reflected shear waves, β is the angle of reflected longitudinal wave, $B_i$, $B_l$, and $B_s$ are the amplitudes of the incident wave, reflected longitudinal wave and reflected shear wave.

What makes this case of shear wave reflection unique from the reflection of a longitudinal wave is the existence of a maximum angle, called the angle of total reflection, beyond which no longitudinal mode reflection is created. So, if the angle of incidence, alpha, is greater than the angle of total reflection, defined by:

$$\sin\gamma = \frac{V_s}{V_l} \tag{5}$$

then only a shear mode reflection is generated.

It is also worth noting that for materials with a Poisson Ratio less than 0.26, there are two angles at which a total conversion of wave mode occurs from the reflection, i.e. an incident longitudinal mode only creates a shear mode reflection and vice versa. This should not be an issue in the test system described herein since Poisson's ratio for 4340 Steel is approximately 0.30 (Mason, W. P., Physical Acoustics and The Properties of Solids, New York, N.Y.: D. Van Nostand Co. Inc., 1958, ch. 1-3, pp. 3-86).

Acoustic Transmission/Refraction

When an acoustic wave intersects with the boundary between two different media, at the interface between two media one must now consider the effects of transmission and refraction of acoustic waves, in addition to reflection.

Longitudinal Waves

Figure 13:
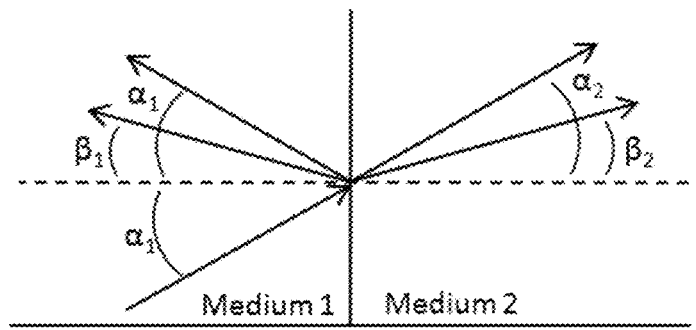
FIG. 13 illustrates reflection and transmission resulting from a longitudinal mode wave at the interface between two media.

The case of an incident longitudinal mode wave will be considered first. When a longitudinal mode wave intersects with the boundary between two media it generates four waves—a longitudinal and shear reflection in the first medium, and a longitudinal and shear mode transmission in the second medium (FIG. 13).

Once again, the geometric relationship between the five waves can be determined using Snell's law:

$$\frac{\sin\alpha_1}{V_{l1}} = \frac{\sin\beta_1}{V_{s1}} = \frac{\sin\alpha_2}{V_{l2}} = \frac{\sin\beta_2}{V_{s2}} \tag{6}$$

where $\alpha_1$ is the angle of incidence and reflected longitudinal wave in medium 1, $\beta_1$ is the reflected shear wave in medium 1, $\alpha_2$ and $\beta_2$ are the reflected longitudinal and shear waves in medium 2, $V_{l1}$ and $V_{s1}$ are the longitudinal and shear velocities in medium 1, and $V_{l2}$ and $V_{s2}$ are the longitudinal and shear velocities in medium 2.

The amplitude of each wave can then be determined using the following system of equations:

$$A_i\cos\alpha_1 = A_l\cos\alpha_1 - B_l\cos\alpha_2 + A_s\sin\beta_1 + B_s\sin\beta_2 \tag{7a}$$

$$A_i\sin\alpha_1 = A_l\sin\alpha_1 + B_l\sin\alpha_2 - A_s\cos\beta_1 - B_s\cos\beta_2 \tag{7b}$$

$$A_i(\lambda_1 + 2\mu_1)k_{l1}\sin 2\beta_1 = -A_l(\lambda_1 + 2\mu_1)k_{l1}\cos 2\beta_1 + \tag{7c}$$
$$B_l(\lambda_2 + 2\mu_2)k_{l2}\cos 2\beta_2 + A_s\mu_1 k_{s1}\sin 2\beta_1 - B_s\mu_2 k_{l2}\sin 2\beta_2$$

$$-A_i\mu_1 k_{l1}\sin 2\alpha_1 = \tag{7d}$$
$$-A_l\mu_1 k_{l1}\sin 2\alpha_1 - B_l\mu_2 k_{l2}\sin 2\alpha_2 - A_s\mu_1 k_{s1}\cos 2\beta_1 - B_s\mu_2 k_{s2}\cos 2\beta_2$$

where $A_i$, $A_l$, $A_s$ are the amplitudes of the incident longitudinal, reflected longitudinal, and reflected shear waves in medium 1, $B_l$ and $B_s$ are the amplitudes of the longitudinal and shear waves in medium 2, $\lambda_1$ and $\mu_1$ are the Lamé constants for medium 1, $\lambda_2$ and µ2 are the Lamé constants for medium 2, and the k are defined as:

$$k_i = \frac{\omega}{V_i} \tag{8}$$

Shear Waves

Figure 14:
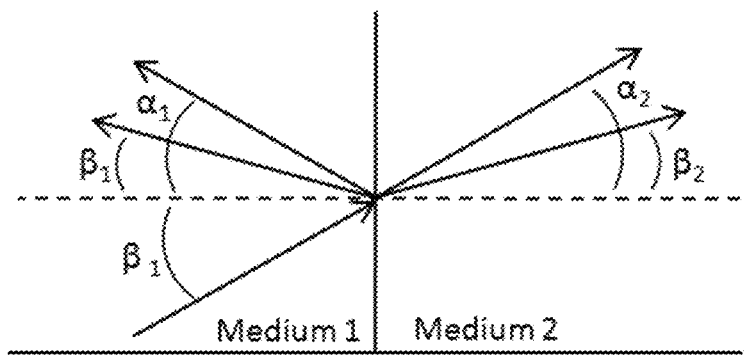
FIG. 14 illustrates reflection and transmission resulting from a shear mode wave at the interface between two media.

Once again, with shear waves two cases will be considered—when the boundary is parallel to the motion of the particles, and when it is not. In the first case, when the boundary is not parallel to the motion of the particles, four reflected/transmitted waves are created just like with longitudinal mode wave (FIG. 14). Once again, the geometry of the waves can be determined by Snell's law, equation 6, and the amplitude of the waves can be determined by changing the left hand side of the system of equations 7 to the following:

$$A_i \sin \beta_1 = \ldots \quad (9a)$$

$$A_i \cos \beta_1 = \ldots \quad (9b)$$

$$-A_i \mu_1 k_{1s} \sin 2\beta_1 = \ldots \quad (9c)$$

$$-A_i \mu_1 k_{1s} \cos 2\beta_1 = \ldots \quad (9d)$$

Figure 15:
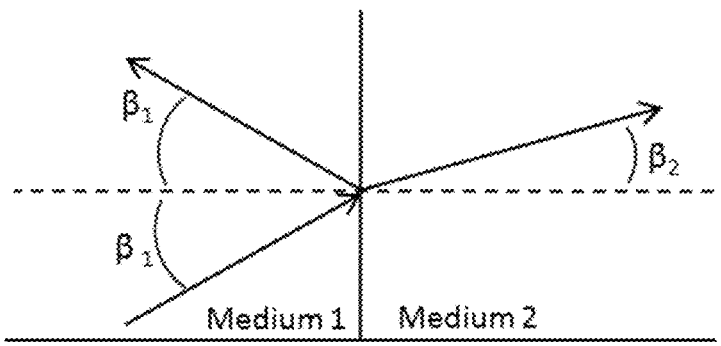
FIG. 15 illustrates reflection and transmission resulting from a shear mode wave at the interface between two media.

For the second case, where the boundary is parallel to the particle motion, no birefringence occurs, and therefore no longitudinal waves are transmitted or reflected. Instead, a single shear wave is transmitted and a single shear wave is reflected (FIG. 15).

Once again, Snell's law can be used to determine the geometric values, and the following equations can be used to determine the amplitude of each wave:

$$A_i + A_s = B_s \quad (10a)$$

$$-\frac{\mu_1}{V_{s1}}(\cos\beta_1 A_i - \cos\beta_1 A_s) = \frac{\mu_2}{V_{s2}}\cos\beta_2 \beta_s \quad (10b)$$

where $\mu_1$ and $\mu_2$ are the Lamé constants of media 1 and 2, $V_{s1}$ and $V_{s2}$ are the shear wave velocities of media 1 and 2, and $A_i$, $A_s$ and $B_s$ are the amplitudes of the incident wave, reflected shear wave and transmitted shear wave, respectively.

Implications for Transmission Across Flat Barriers

Ideally, when communicating across flat barriers, one has two parallel boundaries to consider, and the acoustic waves are travelling perpendicular to those barriers. This fact helps to greatly simplify the analysis of the reflection, transmission and refraction since there are no oblique angles of incidence.

When a wave, of any mode, intersects with a free boundary at a normal angle, only a single reflection is created. That reflection is identical in mode and amplitude, and only incurs a 180° phase shift. Similarly, when one considers a wave, of any mode, that intersects with the boundary between two media at a normal angle, it creates only a single reflection and a single transmission of that same mode, and no refraction occurs. The amplitudes of the transmitted and reflected waves are then calculated by multiplying the amplitude of the incident wave by the reflection and transmission coefficients, which are defined as:

$$R = \frac{Z_2 - Z_1}{Z_1 + Z_2} \quad (11)$$

$$T = \frac{2Z_1}{Z_1 + Z_2} \quad (12)$$

where $Z_1$ and $Z_2$ are the characteristics impedances of the two materials measured in Rayls.

This simplification in the governing equations makes analytical assessment of the echoes within a flat wall a relatively easy task. The acoustic waves bounce back and forth between the two walls transmitting a small portion of energy into the transducers during each reflection, until all of the energy has dissipated. No oblique angles are ever encountered, and as such, no wave modes other than those desired are introduced into the channel. So on the receive side of the channel one would expect to see a series of evenly spaced pulses with decreasing amplitude; the amplitude of each pulse and the frequency of the waveform can be easily calculated using the dimensions and material properties of the transducers and channel.

Implications for Transmission Across Cylindrical Barriers

Unfortunately, analytical assessment of the echoes within a cylindrical wall is a more daunting task. While there is a portion of the acoustic wave that will act identical to the flat wall simulation, this only occurs at the singular point on the wall where the tangent of the curve is perpendicular to the acoustic wave. At every other point on the wall, the waves will be intersecting at oblique angles, and therefore creating alternate mode waves. At each reflection, a single wave will create two reflected waves of different modes, which will each travel at different speeds. Additionally, as a result of the different reflection angles, each wave will travel a slightly different distance before reaching the other side of the barrier. Due to these effects of increasing number of waves, different wave modes, varying speeds, and different travel distances, the echo within a cylindrical channel will likely be the sum of a multitude of pulse trains with varying amplitudes, frequencies, and time offsets.

With this review of the acoustic phenomena of reflection, transmission, and refraction it is clear that the echoes observed in a metal channel can vary greatly depending on geometry, material properties, and wave mode. If we also consider additional complications such as transmission in anisotropic media, acoustic attenuation, dispersion and scattering from material imperfections, and other such phenomena, the problem quickly becomes too complicated to solve without the use numerical methods. Therefore, in the next section a set of Matlab simulations are created to help qualitatively asses the echoes within flat and cylindrical metal channels.

Simulation

One of the most significant challenges in developing high speed, efficient through metal communication, is dealing with the high multipath nature of a metallic channel. Due to the relatively high characteristic acoustic impedance of metal compared to the surrounding materials (air or piezoelectric transducer), the majority of acoustic energy transmitted into the barrier remains inside. When an acoustic wave reaches the boundary of the metal channel, the amount of energy that is transmitted/reflected can be calculated via the relationship between characteristic acoustic impedance of the two materials. Using the reflection and transmission coefficients defined above, it can be seen that at a barrier between air and steel, which have characteristic acoustic impedances of 47 MRayl and 411 Rayl, over 99.9% of energy is reflected back into the barrier. In the case of a boundary between steel and a glycerin based couplant, which has a characteristic impedance of 2.5 MRayl, approximately 88% of energy is reflected. When communicating across flat walls these reflections/echoes cause significant ISI and limit the maximum achievable data rate. Primerano et al. have modeled these echoes encountered in a flat wall, and developed methods for negating their effects, through the use of a pre-distortion filter (Primerano et al., "Echo-Cancellation for Ultrasonic Data Transmission through a Metal Channel," Information Sciences and Systems, 2007, CISS '07, 41st Annual Conference on, vol. 14, no. 16, pp. 841-845, March 2007; Primerano et al., "High bit rate ultrasonic communication through metal channels," Information Sciences and Systems, 2009, CISS 2009, 43rd Annual Conference on, vol. 18, no. 28, pp. 902-906, March 2009).

Figure 16:
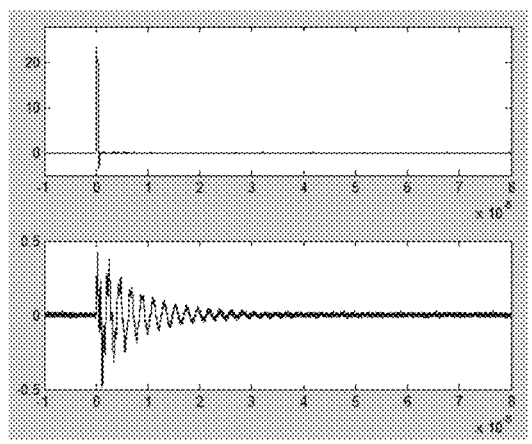
FIG. 16 illustrates an observed echo in a curved surface.

During initial testing of transmission across a curved surface, a similar echo phenomenon was expected to be observed; however, no such echoes were encountered. Instead, the impulse response of the system showed a long "tail" echo composed of an exponentially decreasing sinusoidal wave (FIG. 16). In order to understand why this "tail" was observed instead of distinct individual echoes, Matlab was utilized to create acoustic simulations. Using K-wave, an open source acoustic wave simulation toolbox, two simple simulations were completed—one for a flat barrier and one for a curved barrier.

Figure 17:
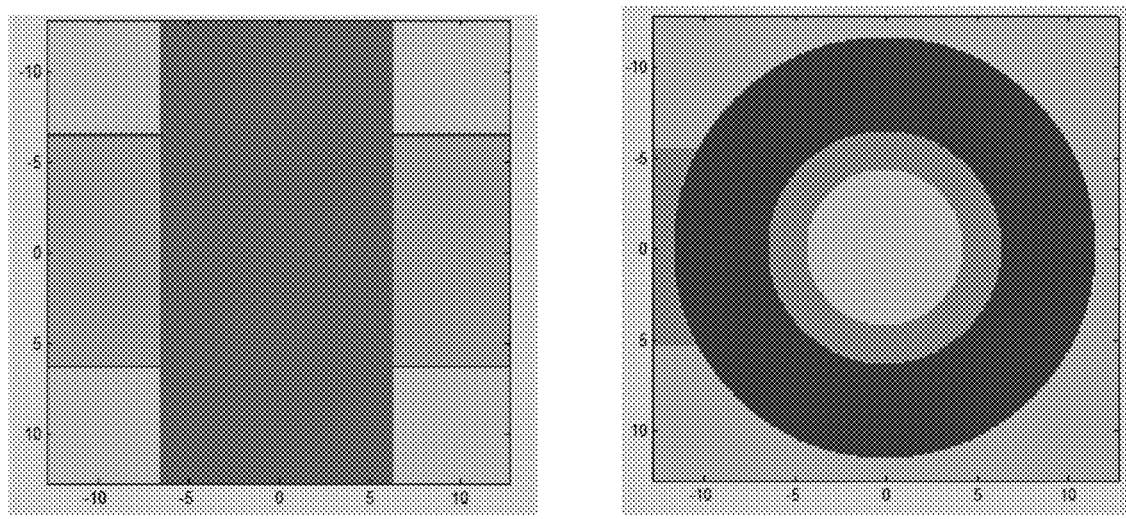
FIG. 17 illustrates density plots for flat and curved barrier simulations.

A K-wave allows users to define a sample test bed by specifying material properties such as density and speed of sound. Once the test bed is created, a sensor mask and initial pressure values can be defined, and the simulation is run for a user-defined period of time. Since these simulations were only being utilized for visual analysis of the echo patterns, they were greatly simplified. For these simulations only three materials were considered: air, steel, and piezoelectric material (PZT-4). All materials were assumed to be completely uniform, with perfect edges, and the possible effects of surface contaminants, coupling gel, etc. were ignored. Density plots for flat and curved barrier simulations are shown in FIG. 17.

For each simulation a single grid width line of initial pressure was defined within the transmitting transducer, just before the edge of the boundary between the transducer and metal barrier. This simulates a pressure wave created by a flat, thickness mode piezoelectric transducer. Similarly, the sensor mask for each simulation was defined as a single grid width inside the receiving transducer just before the edge of the transducer-metal boundary. For the case of the curved barrier simulation, the transmitting piezoelectric transducer was assumed to be convex with the same curvature as the barrier, and the receiving piezoelectric transducer was considered to be a cylindrical transducer.

Visualization of Echoes in Flat Barrier

Figure 18A:
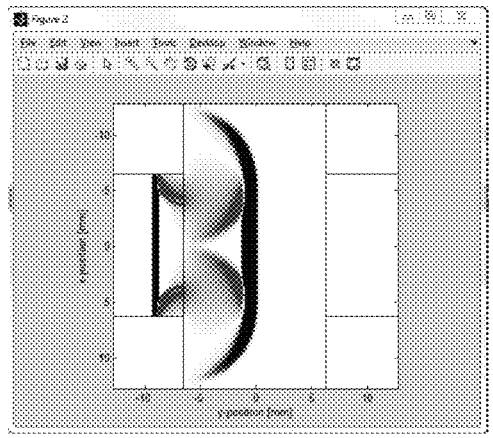
FIGS. 18(a)-18(d) illustrate K-wave simulation of echoes in a flat barrier.
Figure 18B:
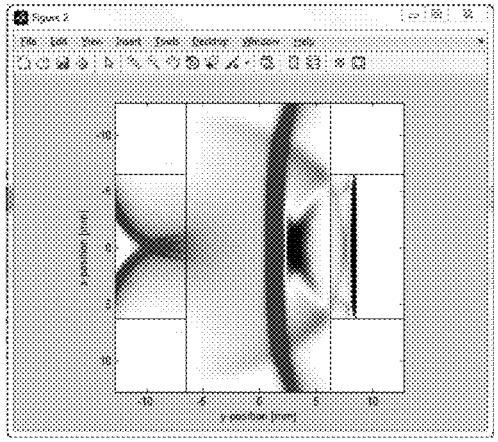
Figure 18C:
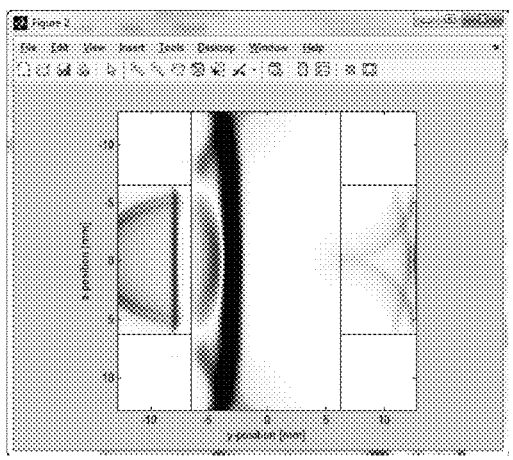
Figure 18D:
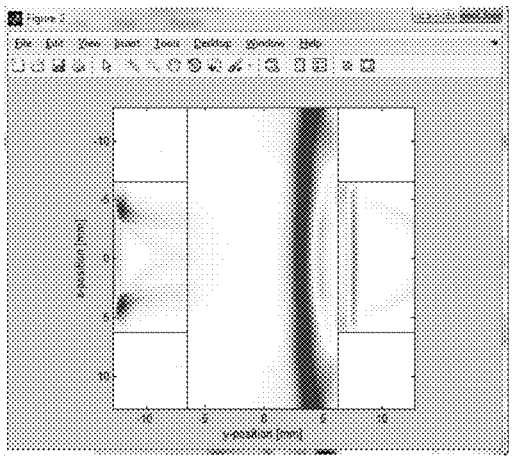
Figure 19:
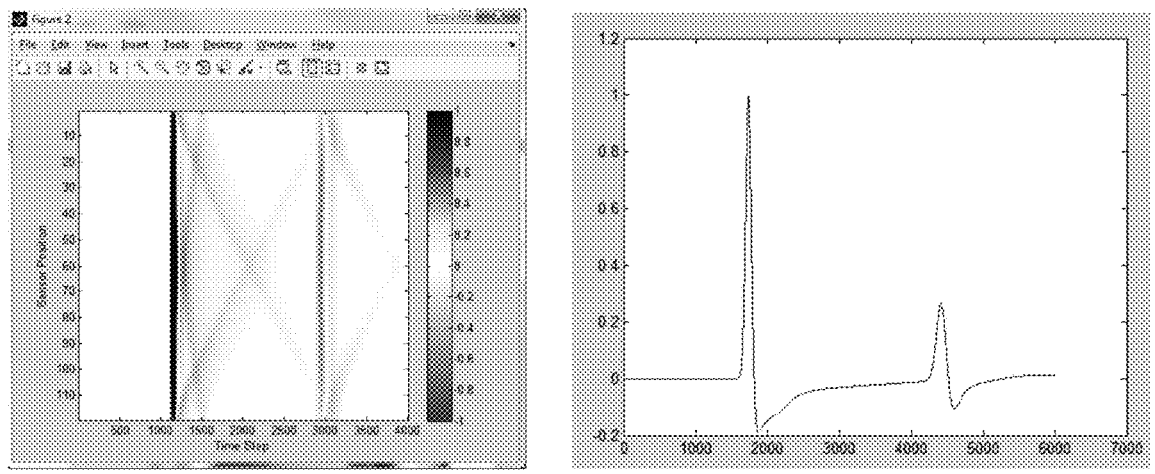
FIG. 19 illustrates the results of a flat wall simulation.

At the start of the simulation, the initial pressure creates a wave that proceeds into the metal barrier (FIG. 18a). As this acoustic wave hits the boundary of the barrier, a portion of the energy is transferred into the receiving transducer, while the majority of the energy is reflected back toward the transmitting transducer (FIG. 18b). Upon reaching the transmitting side of the barrier again, a small portion of the energy is transferred back into the transmitting transducer, but once again the majority of the energy is reflected (FIG. 18c). This reflection then hits the receive side of the barrier and transmits a second pulse of energy to the receive transducer (FIG. 18d). These reflections continue until all of the energy from the waves has dissipated, which can result in a different number of received pulses depending on the thickness and composition of the barrier.

The final output of the simulation is a graph of the normalized pressure measured at each sensor grid vs. time (FIG. 19a). Looking at this graph, two distinct positive pulses can be seen, each of which has much smaller negative pulses immediately following them. By summing the pressure from every sensor grid at a given time step and normalizing again, a waveform can be created that can be interpreted as the electrical signal seen from the receive transducer (FIG. 19b). Again, two distinct pulses are visible—the initial transmit pulse, and the primary echo. The results of this simulation match well with the results of the simulation completed by Primerano et al. in "High Bit-rate Data Digital Communication through Metal Channels," Ph.D. dissertation, ECE Dept., Drexel University, Philadelphia, Pa., 2010.

Visualization of Echoes in Curved Barrier

As discussed above, the assumption when testing transmission through cylindrical walls was that a waveform composed of a series of impulse trains would be observed. To test this, an identical pressure wave was defined and applied to the curved surface simulation.

Figure 20A:
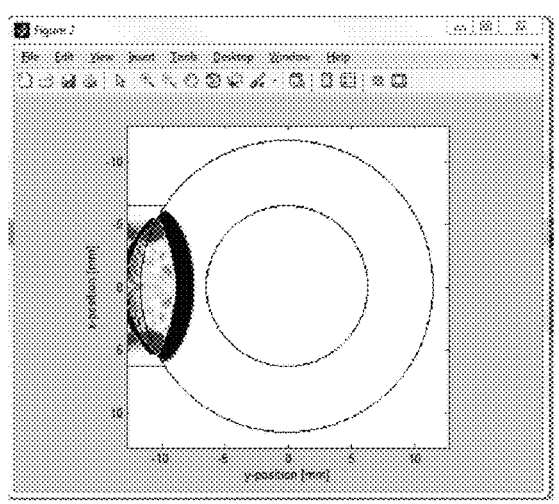
FIGS. 20(a)-20(e) illustrate K-wave simulation of echoes in a curved barrier.
Figure 20B:
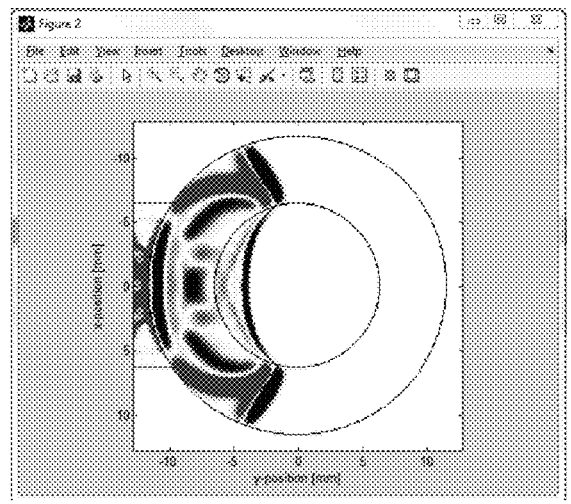
Figure 20C:
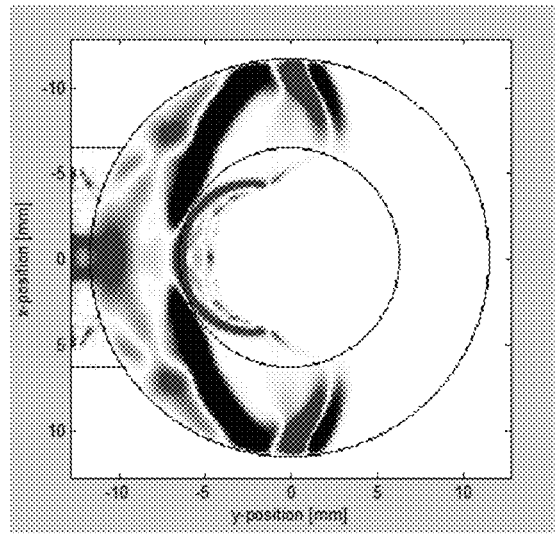
Figure 20D:
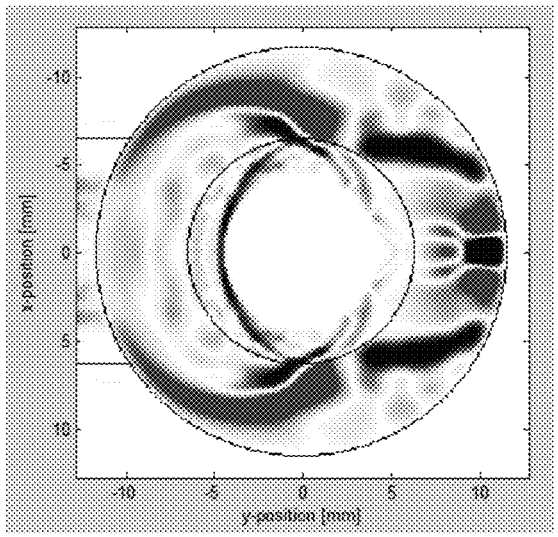
Figure 20E:
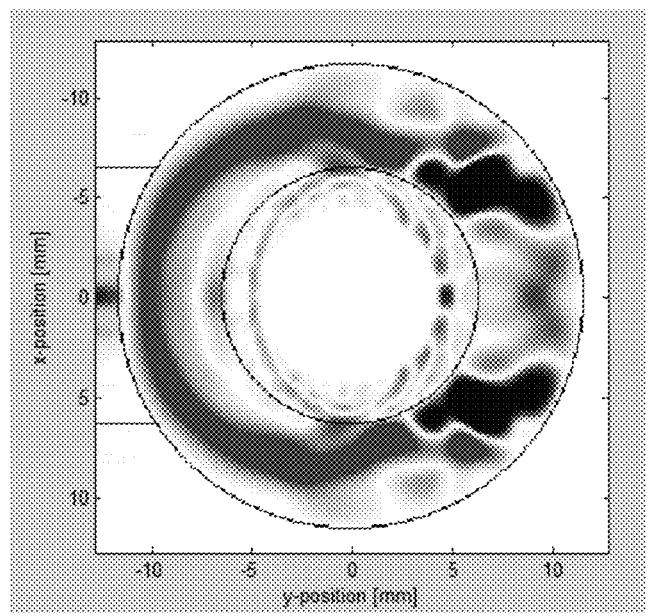

Once again, at the start of the simulation, the initial pressure creates a wave that proceeds into the metal barrier (FIG. 20a). As this acoustic wave continues, a portion of the wave makes contact with the internal boundary, and at that point some energy is transferred to the internal transducer and the majority is reflected back to the exterior, just as it was with the flat wall. However, due to the curved internal barrier, a portion of the wave does not make direct contact with the internal barrier, and instead continues around the circumference of the barrier (FIG. 20b). On a portion of the barrier, the echoes continue just as they did in the flat wall, with the wave bouncing back and forth between the two walls until all of the energy is dissipated. However, with the curved barrier, a portion of every echo continues to travel around the circumference of the barrier (FIG. 20c). As these waves continue to travel back and forth around the circumference of the barrier, they continually transmit small amounts of energy into the transducer (FIG. 20d). When the waves finally collide on the opposite side of the curved barrier, they reflect and begin to travel in the opposite direction (FIG. 20e). This pattern continues until all the energy has dissipated.

Figure 21A:
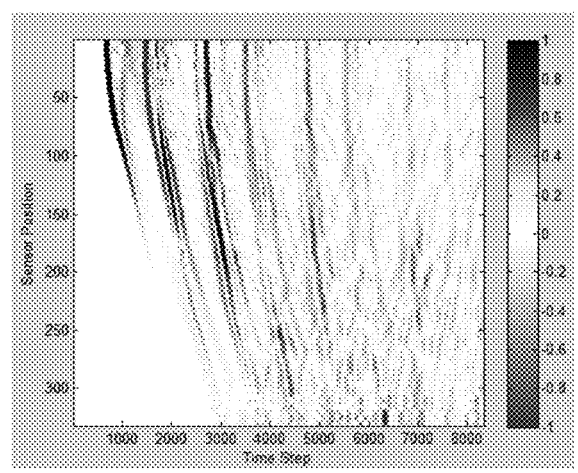
FIGS. 21(a)-21(c) illustrate results of simulation compared with experimental results.
Figure 21B:
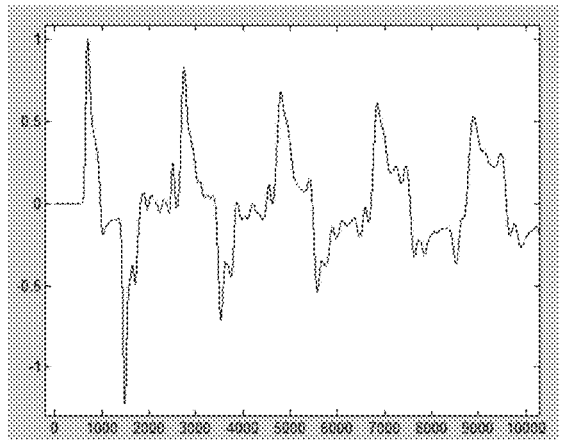
Figure 21C:
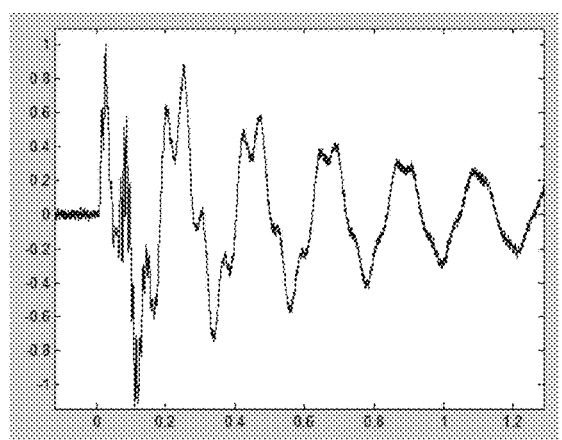

Just as with the flat wall simulation, a final graph of the normalized pressure measured at each sensor grid vs. time is created (FIG. 21a). In this graph, a dense set of positive and negative waves is observed. Looking closely at the first received wave one sees that is curved, rather than flat as it was in the previous simulation. This shows part of the distortion expected from a curved wall, but it is incredibly difficult to interpret this graph for any further information. By summing the pressure for the whole sensor mask at each time step and normalizing again, a sample electrical signal is created (FIG. 21b). This signal shows a sinusoidal waveform with decreasing magnitude, which closely matches the "tail" echo observed in the experimental data (FIG. 21c).

Figure 22:
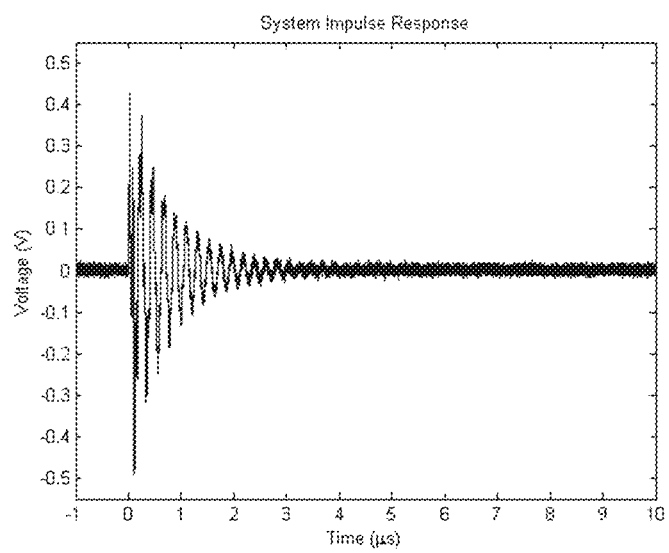
FIG. 22 illustrates a system impulse response.

Looking at the simulation results, there is a series of alternating positive and negative primary pulses, with a series of smaller pulses constantly seen across the waveform. The varying magnitude of these smaller pulses matches the assumptions made above. Looking at the experimental results, the same pattern of alternating positive and negative primary pulses is observed with a series of smaller pulses seen across the waveform. In the experimental data, this secondary series of smaller pulses is less defined, but the same pattern is recognizable. When viewed from a larger scale this pattern looks like a noisy, exponentially decaying sinusoid, as seen in FIG. 22.

Figure 23:
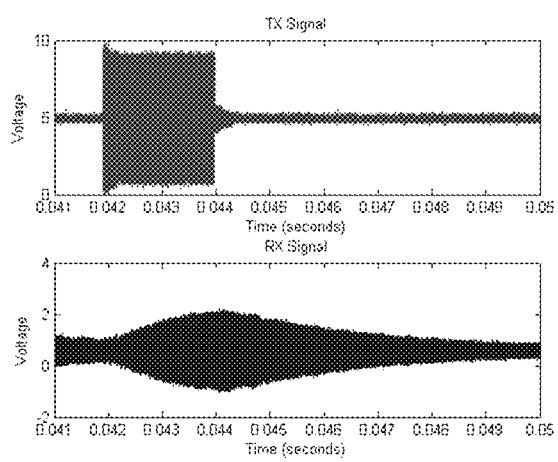
FIG. 23 illustrates a CW echo.

When looking at a continuous wave transmission this "tail" echo effect is even more pronounced as a result of resonance in the transducer (FIG. 23). In this test, a continuous sinusoid was modulated by a square wave. While the transmitted pulse is a square wave only 2 ms in duration, the received signal consists of an elongated pulse that lasts approximately 8 ms. Looking closely at the received waveform, the first portion of the wave consists of a slowly increasing amplitude that peaks after approximately 2 ms. It follows intuitively that this portion of the wave corresponds to the transmitted pulse. However, there is then 6 ms of a slowly decreasing "tail" portion that is the combined result of resonance in the transducer and echoing in the barrier.

Regardless of the nature of the echo, whether it is a set of distinct pulses or a trailing "tail", the ultimate effect on through metal communication is the same. Both types of echoes create ISI that limits the maximum data rate achievable with simple communication schema such as CW-PAM, or on-off keying with an impulse train. However, the difference in the types of echoes observed on a flat and curved barrier means that the exact pre-distortion filter developed by Primerano et al. cannot be directly applied to this system. However, through similar analysis of the impulse response of the curved wall system in future work, a comparable pre-distortion filter should be achievable.

Results

As discussed above, the first objective of this work was to overcome the difficulties of obtaining sufficient transducer contact on a curved surface. When attempting to utilize a flat transducer on a curved surface, there is very little contact made. While this problem could be easily resolved by altering the geometry of the barrier, it is desirable to develop a system that does not require any such modification of the barrier itself. In order to increase contact between the transducer and barrier, a radial mode transducer ring is selected for use. By selecting a radial mode transducer whose radius matches the internal radius of the barrier, complete contact can be made between the transducer and the barrier. In a typical industrial application, this would require a custom made piezoelectric transducer, but for testing, a standard commercially available transducer was selected and the interior of the test vessel was machined to match. For simplicity, an identical radial mode transducer was used externally.

Figure 24:
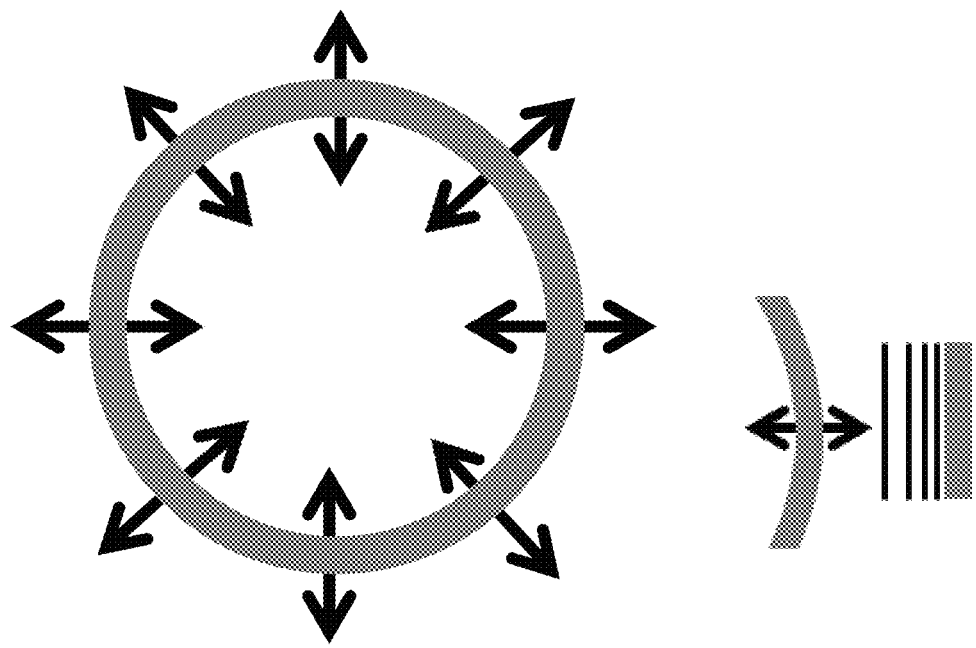
FIG. 24 illustrates expanding of a radial mode transducer and a transducer slice acting as a longitudinal mode transducer.

This ring transducer was assumed to act as a radial array of infinitely small longitudinal mode transducers. This follows intuitively if one considers a small slice of the ring expanding and contracting radially, its motion matches that of a longitudinal mode transducer expanding through its thickness (FIG. 24).

This assumption means that with a radial mode transducer mounted within a metal cylinder such as the test container, a standard longitudinal mode transducer could be aligned anywhere along the circumference of the cylinder without detriment to the transmission. This hypothesis is explored in detail below.

Transducer Contact

Figure 25:
FIG. 25 illustrates contact between an external transducer and a test vessel in an exemplary embodiment.
Figure 25:
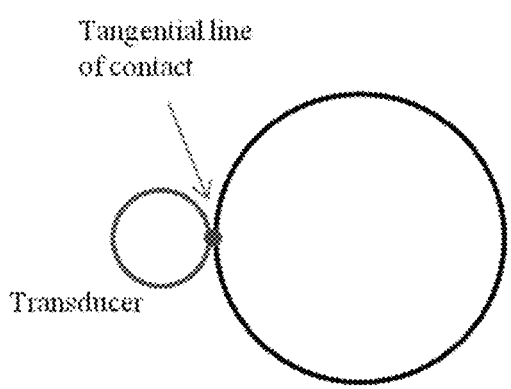
Figure 26:
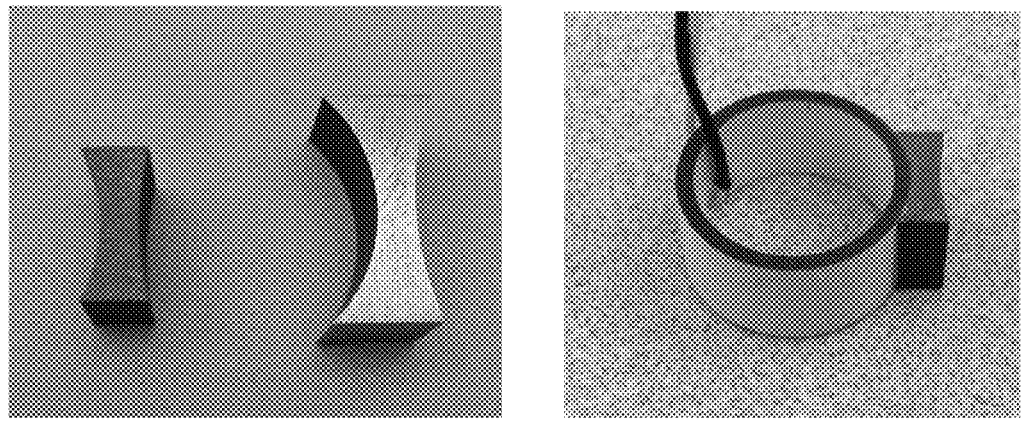
FIG. 26 illustrates transducer horns and a transducer bonded to a horn in an exemplary embodiment.

While the selection of the radial mode transducer eliminates the contact issue internally, the use of an identical transducer externally still provides only tangential contact, as shown in FIG. 25.

In order to provide better contact externally, a set of acoustic "horns" was developed. These horns (FIG. 26) were milled from the same steel as the barrier and are designed to match the respective curvatures of the transducer and barrier, theoretically providing a conduit for more acoustic energy to be transmitted.

As acoustic energy passes from one medium to another, the amount of energy transmitted from the first medium to the second is determined by the characteristic acoustic impedances of the two materials. At the boundary between two different media, the amount of energy reflected back into the original media is determined by the Reflection coefficient, which is calculated as follows:

$$R = \frac{Z_2 - Z_1}{Z_1 + Z_2} \quad (11)$$

The amount of energy that is reflected is equal is $R^2$ of the energy in the incidental wave. In the case of a boundary between steel and PZT-4, where steel has a typical impedance of 47 MRayl, and PZT-4 has a typical impedance of 30 MRayls, only approximately 5% of the energy is reflected while the rest is transmitted across the boundary. However, if one considers a steel-air boundary, or PZT-air boundary, over 99% of the energy is reflected since the impedance of steel and PZT is several orders of magnitude greater than the impedance of air, which is around 400 Rayl.

With the addition of the acoustic horn, there are now two boundaries to consider, the piezo-horn boundary, and the horn-barrier boundary. If one considers the ideal scenario, with perfect interfaces at each of these boundaries, then 5% of the initial energy is reflected at the piezo-horn boundary and no energy is reflected at the horn-barrier boundary. Looking at the real world application there is significantly more loss. The horn is secured to the transducer with an epoxy, which creates another boundary and increases the amount of energy lost. Given that Epoxy has an impedance of 3.25 MRayls (David, J.; and Cheeke, N., Fundamentals and Applications of Ultrasonic Waves, Washington, D.C.: CRC Press, 2002, pp 46-84), 75% of the initial energy is reflected at the piezo-horn connection. Additionally, as the result of an imperfect interface, and surface contaminants causing diffraction, more energy is lost at the horn-barrier interface.

Figure 27:
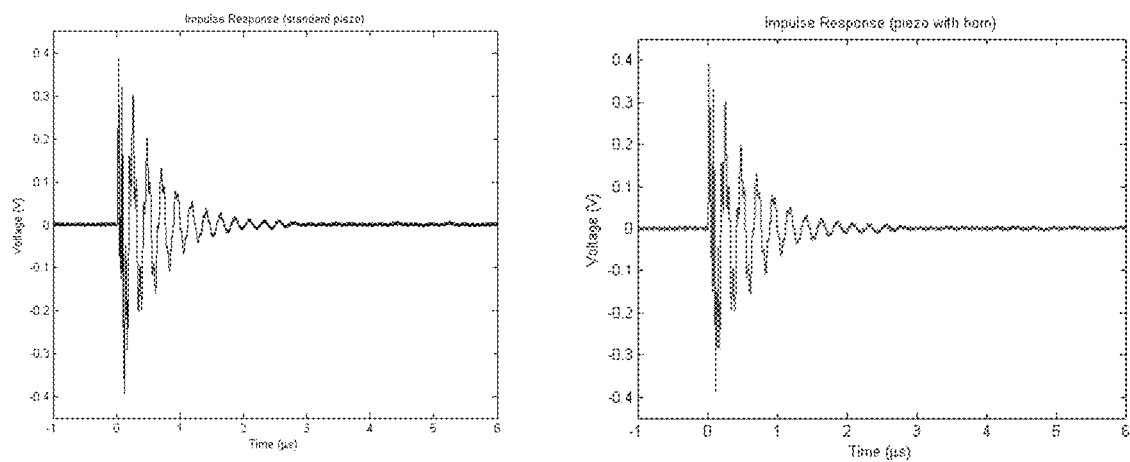
FIG. 27 illustrates the impulse response from a transducer and a transducer with a horn.

These additional energy losses may counteract the benefit of increased surface area for acoustic transmission. Comparing the impulse response of a piezoelectric transducer in direct contact with the barrier and a piezoelectric transducer with a horn, peak amplitudes of 0.78 volts peak to peak (VPP) were measured for each (FIG. 27).

While no noticeable change in system performance is seen from the use of the horn, it does provide some mechanical benefits. The addition of the horn makes it easier to hold the transducer in place on the exterior of a cylindrical barrier. Also, if the steel barrier is in good condition (i.e. little surface imperfection or contamination), the horn reduces the need for coupling gel.

Electromagnetic Acoustic Transducers (EMATs)

In addition to the use of piezoelectric transducers and acoustic horn attachments, a non-contact transmission system was developed utilizing an Electromagnetic Acoustic Transducer (EMAT). Like piezoelectric transducers, EMATs are utilized in a variety of non-destructive testing (NDT) applications. EMATs provide a significant advantage over direct-contact piezoelectric transducers since they generate the ultrasonic waves within the test material itself, rather than transmitting the waves into the material. This eliminates the need for direct contact between the transducer and the barrier, and significantly reduces the need for any surface preparation. Since the EMAT does not require direct contact, it can work in a number of situations where a piezoelectric transducer could not, i.e. on a material that is too hot to make direct contact with. While the EMAT has many advantages, it is significantly less efficient than piezoelectric transducers; an EMAT requires a lot more power to generate a signal with the same amplitude.

An EMAT creates ultrasonic waves through the excitement of Eddy currents and the generation of Lorentz forces. An EMAT consists of two primary components: a length of wire with an alternating current, and a static magnetic field. By placing a wire with an alternating current near a conductive material, Eddy currents are induced in the skin depth of the material based on Faraday's Law of Induction. When exposed to a static magnetic field, these Eddy currents generate a Lorentz force orthogonal to the plane created by the current and magnetic field:

$$F=q(E+v\times B) \tag{13}$$

where E is the electric field, B is the magnetic field, v is the velocity of the particle, and q is the charge of the particle.

This mechanism can be utilized to excite a variety of modes of acoustic waves, including a variety of complex wave modes that are not easily realized with a piezoelectric transducer, giving yet another advantage to the use of EMATs. While these complex wave modes may have significant application in non-destructive testing, we are only interested in longitudinal mode waves for this communication application.

EMAT Design

Figure 28:
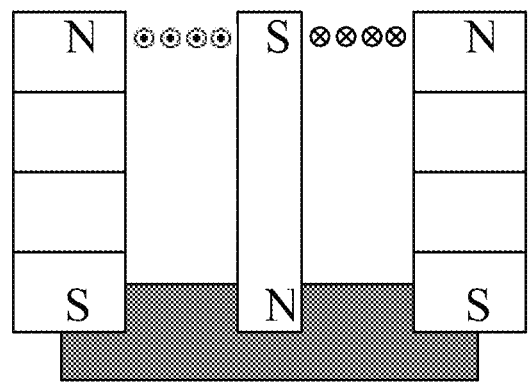
FIG. 28 illustrates a design of an EMAT for efficient generation of longitudinal waves in an exemplary embodiment.

In 2005 a team at the University of Maine developed a novel EMAT design for efficient generation of longitudinal waves (da Cunha et al., "Improved longitudinal EMAT transducer for elastic constant extraction," Frequency Control Symposium and Exposition, 2005. Proceedings of the 2005 IEEE International, vol. 29, no. 31, pp. 426-432, August 2005). This EMAT was designed to increase the strength of the magnetic field and increase the amount of active coil in order to eliminate parasitic inductance. This was accomplished by creating a cylindrical design that reduces the distance between magnetic poles and keeps the entire coil in the magnetic field (FIG. 28).

Figure 29:
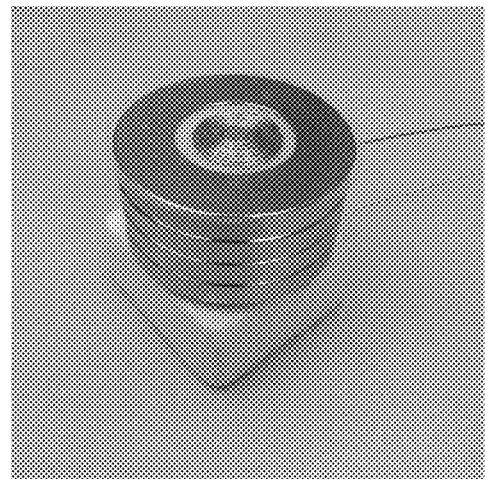
FIG. 29 illustrates a constructed EMAT in an exemplary embodiment.

For testing, a nearly identical EMAT has been developed. The EMAT consists of a total of five NdFeB grade N42 magnets—a stack of four axially magnetized rings (K&J Magnetics model #RY0X04) and a single axially magnetized rod (K&J Magnetics model #D4X0). In between the ring and rod sits a pancake coil consisting of 8 turns of AWG 24 magnet wire (FIG. 29).

Figure 30:
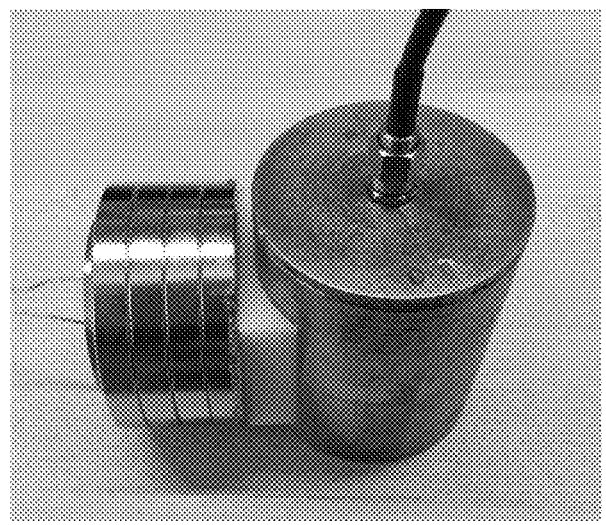
FIG. 30 illustrates an EMAT mounted on a vessel with 3 mm standoff.

In order to prevent direct contact between the EMAT and the vessel during testing, a 3 mm standoff was 3D printed out of ABS plastic. This air gap of 3 mm was maintained for all tests involving the EMAT (FIG. 30).

Comparison of EMAT and Piezoelectric Performance

Figure 31:
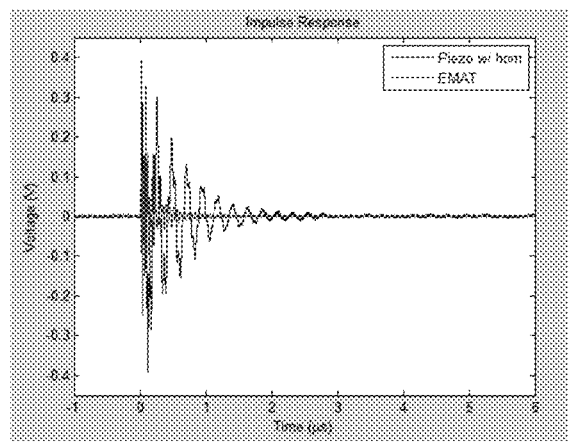
FIG. 31 illustrates comparison of an impulse response with input from an EMAT and piezoelectric transducers.

While the use of the EMAT provides a number of benefits compared to a piezoelectric transducer, its major drawback is efficiency. This is seen in the impulse response of the system when the external piezoelectric transducer is replaced with the EMAT. Using an identical input from the function generator, a peak amplitude of 0.45 VPP was measured internally. That is a nearly 43% decrease in signal magnitude (FIG. 31).

Figure 32:
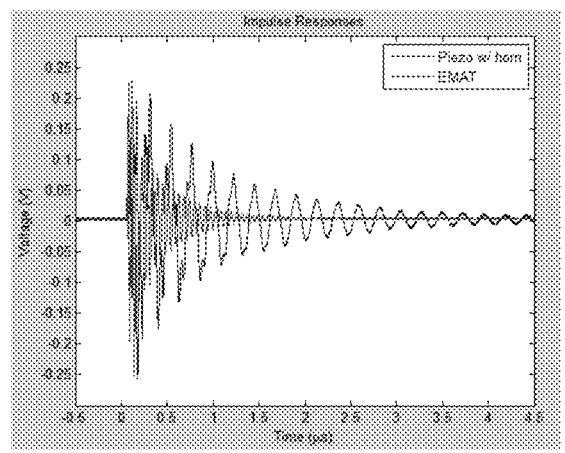
FIG. 32 illustrates comparison of responses from an EMAT and a piezoelectric transducer with the same max VPP.

In addition to this decrease in amplitude, there seems to be an increase in the decay rate of the signal. To more accurately assess this difference in decay rate, a second impulse response was obtained from the piezoelectric transducer, this time with an amplitude that matched that of the EMAT response (FIG. 32).

Even with nearly identical maximum signal amplitude, the signal from the EMAT decayed in about ⅔ of the time when compared with the piezoelectric transducer, approximately 2.2 µs vs. 3.3 µs. Presumably, this is due to a lack of resonance in the EMAT. Given this quicker decay rate, if a comparable SNR can be obtained from both transducers, the EMAT should be able to provide a slightly higher data rate.

Communication Schemes

Narrowband

Figure 33:
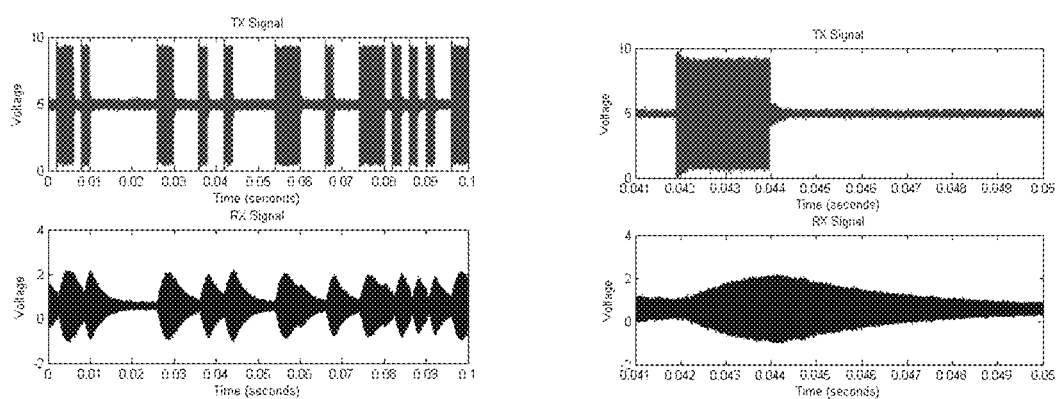
FIG. 33 illustrates CW-PAM transmission with a 45 kHZ carrier wave and a zoomed in view of one bit.
Figure 34:
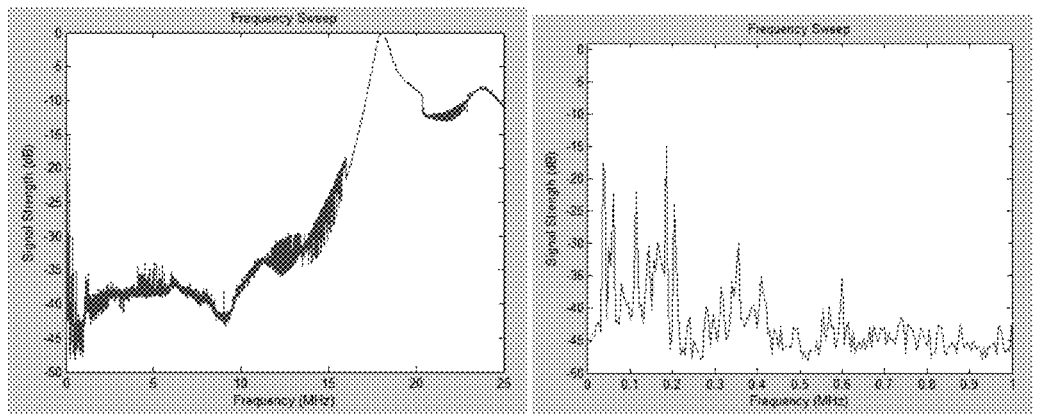
FIG. 34 illustrates resonant frequency sweep from 0-25 MHz (left) and 0-1 MHz (right).

Initial communication testing began with a continuous wave pulse amplitude modulation (CW-PAM) scheme. A carrier frequency of 45 kHz was selected to match the resonant frequency of the transducer. Using a 10 VPP, 45 kHz carrier wave, on-off keying pulse amplitude modulation was utilized to transmit serial data. Without any filtering or equalization this communication method only allowed for a maximum data rate of approximately 500 bps before ISI began to cause significant errors. The resonance within the transducer creates a "tail" on each bit that takes over 5 µs to decay to RMS noise levels (FIG. 33). In addition to the advertised resonance peak of the transducer, there were a number of comparable peaks in the hundred kHz region, and a significant peak was found around 18 MHz (FIG. 34).

Wideband

Figure 35:
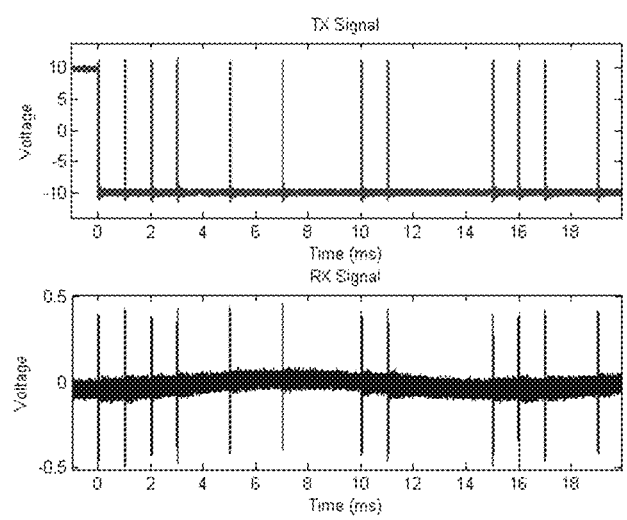
FIG. 35 illustrates 1 kbps transmission using an OOK pulse train.

In order to capitalize on the multiple resonant frequencies of the system, a wideband communication scheme was utilized. Using an on-off keying scheme with an impulse train, the inventors hoped to excite multiple frequencies simultaneously and to achieve a more robust transmission with a higher data rate and higher SNR. A transmission scheme was developed that consisted of a series of five 5 µs impulses at the start of each bit. FIG. 35 shows a sample transmission at a data rate of 1 kbps.

Figure 36:
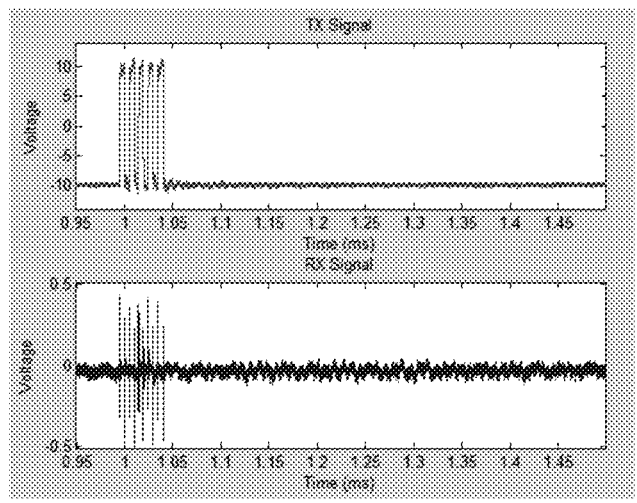
FIG. 36 illustrates a single bit view of a wideband modulation scheme.

A closer look at each impulse cluster shows no signs of echoing, meaning the data rate could be substantially improved. While keeping all five redundant impulses for each bit, a data rate of up to 20 kbps is achievable (FIG. 36).

Figure 37:
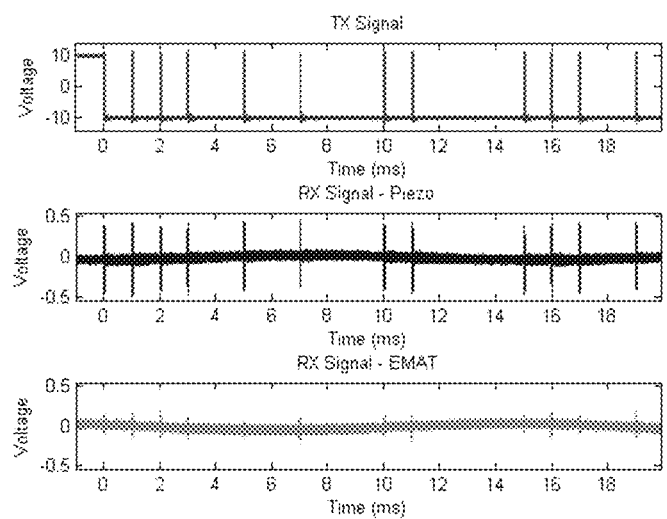
FIG. 37 illustrates comparison of a wideband modulation scheme for a piezoelectric transducer and for an EMAT.

Comparing the performance of this impulse modulation scheme for the piezoelectric transducer and the EMAT, the inventors see SNR values of 5.2 dB and 3.2 dB, respectively. With these low SNR values, and a maximum symbol rate of 20 ksps, the use of a piezoelectric transducer would allow for a maximum data rate of approximately 40 kbps, while the EMAT would only allow for a maximum data rate of 32 kbps (FIG. 37).

Figure 38:
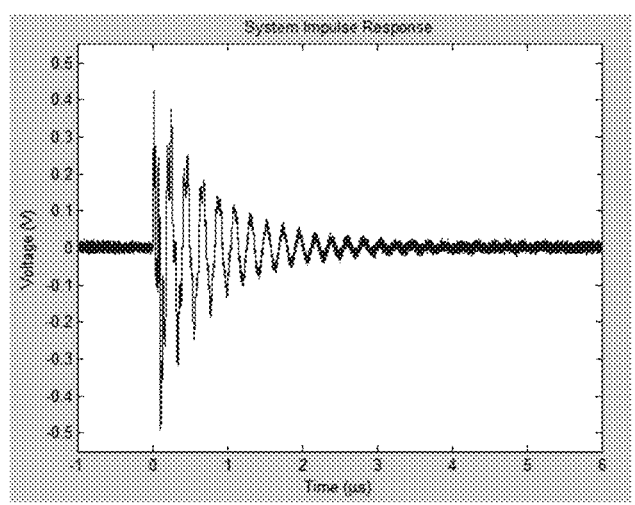
FIG. 38 illustrates a system impulse response showing a 3.5 µs echo decay time.

If the inventors wanted to maximize the data rate of the system, without implementing echo cancellation, an on-off keying scheme consisting of 56 ns impulses could be used to enhance ringing at the 18 MHz resonant frequency. As FIG. 38 shows, when the system is excited with a 56 ns impulse from a piezoelectric transducer, the echo "tail" fades to the level of RMS noise in approximately 3.5 µs. Even with a very conservative approximation of 10 µs for every echo to completely fade, a modulation scheme utilizing 56 ns impulses could achieve a symbol rate of up to 100 ksps. If it is assumed that exactly 3.5 µs fade time for each echo, then the system could be capable of up to 285 ksps, before any ISI occurs. Given a maximum symbol rate of 285 ksps, and an SNR of 5.2 dB, a maximum data rate of nearly 600 kbps is achievable, without any echo equalization.

Two-Way Communication

Figure 39:
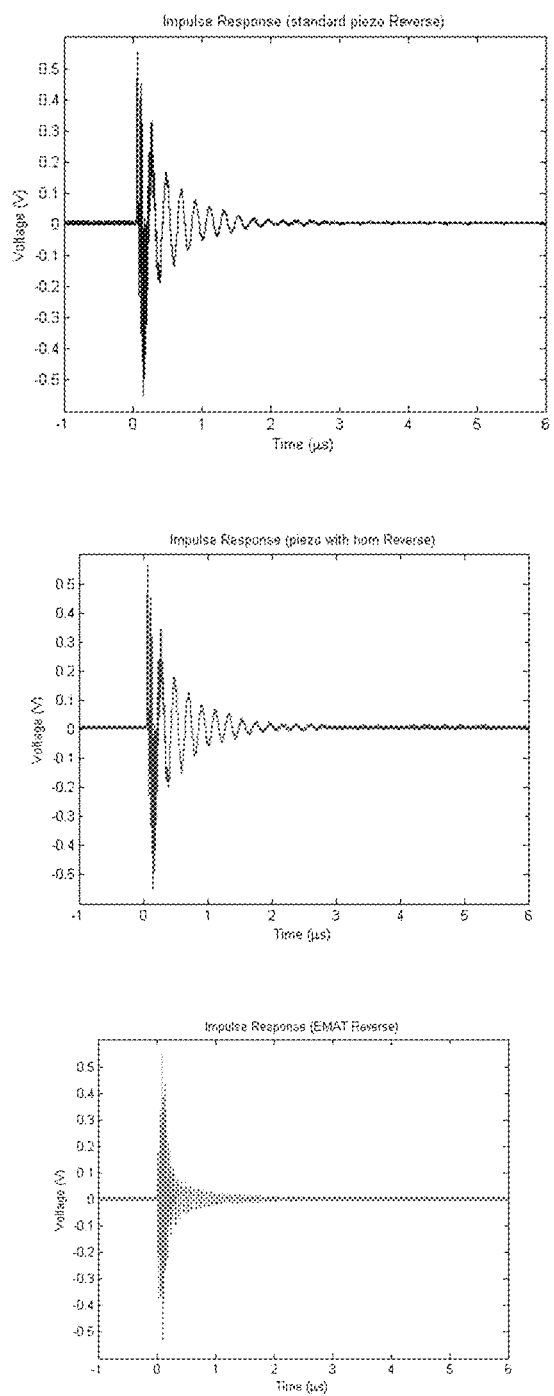
FIG. 39 illustrates a response of a system for an input of 56 ns impulse applied to an internal transducer.

The viability of 2-way communication with this system was tested by examining the reverse impulse response of the system for each of the three external transducer set-ups. As was seen previously, the piezoelectric and piezoelectric with horn seems to perform identically with maximum amplitudes of 1.11 VPP each. The EMAT performs much better as a receiver as its impulse response has a peak amplitude of 1.09 VPP, a negligible difference from the performance of the piezoelectric (FIG. 39).

Transducer Alignment

The final challenge addressed by the invention is that of alignment. In ultrasonic transmission across flat surfaces, the system is very sensitive to alignment. Since precise alignment across a curved surface is difficult to maintain, the effects of alignment changes on the efficiency of the system needs to be explored in depth.

Figure 40:
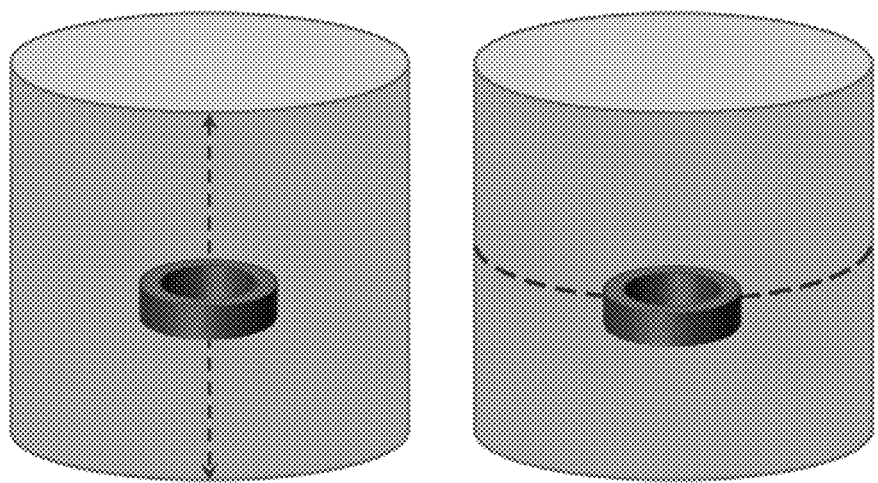
FIG. 40 illustrates a radial baseline (left) and an axial baseline (right).

For alignment testing, two primary baselines were defined—one for measuring axial alignment and one for measuring radial alignment (FIG. 40). For axial alignment, the baseline was defined at the bottom of the internal transducer, which is seated approximately 11 mm from the base of the vessel. For radial alignment, the baseline was defined where the leads are soldered to the internal receiver.

Figure 41:
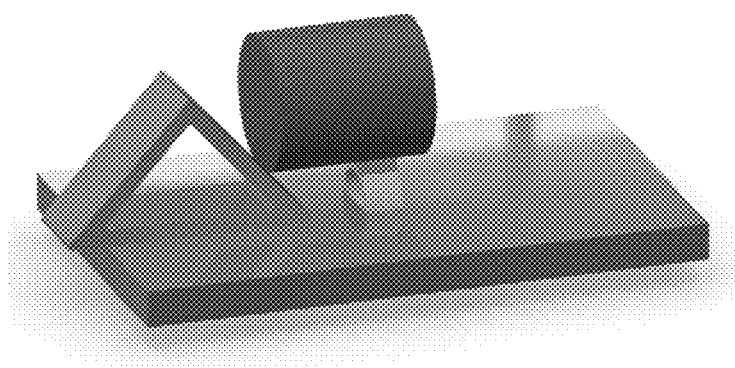
FIG. 41 illustrates a simplified model of the test apparatus for alignment testing in an exemplary embodiment.

In order to ensure consistency in the measurements, a test apparatus was constructed (FIG. 41). The apparatus consisted of a set of aluminum L-brackets that were utilized to hold the transducer in a constant position and orientation (with the horn pointing straight up). The vessel was then placed directly on top of the transducer, and when necessary an aluminum brace was utilized to help support and balance the vessel. This test apparatus allows for a constant force to be applied to the transducer for every test.

Figure 42:
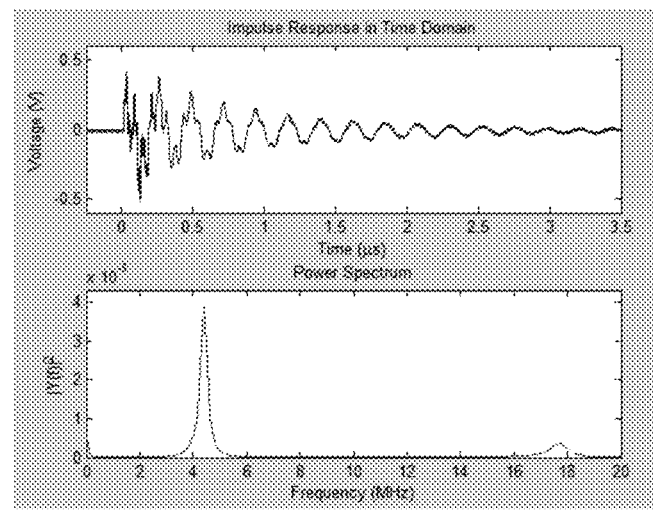
FIG. 42 illustrates a time domain plot and a power spectral plot of impulse response.

The alignment testing procedure was as follows. For each trial, a 56 ns, 20 VPP impulse was applied to the external transducer. The response was then recorded from the internal transducer, and both the time-domain and frequency-domain content was analyzed. As FIG. 42 shows, three local power maxima were identified in the frequency domain for each signal. The first is a relatively small maximum at near DC values, corresponding to the resonant frequency of the transducer, 45 kHz. The second, and largest peak, occurs around 4.5 MHz. The third and final peak occurs around 18 MHz. While the exact power distribution varies slightly for each of the recorded impulse responses, the same three local maxima are always seen around ~45 kHz, ~4.5 MHz, and ~18 MHz.

Figure 43:
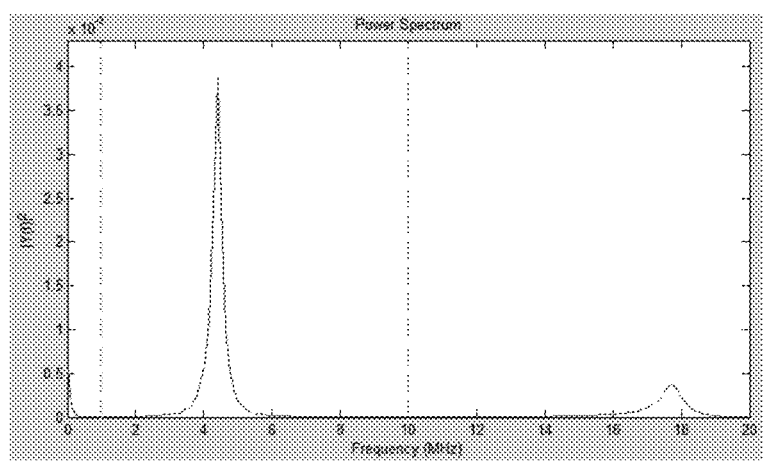
FIG. 43 illustrates frequency band definitions.

Based off these three peaks, the frequency spectrum was divided into three bands for analysis—the low band (0-1 MHz), the mid band (1 MHz-10 MHz), and the high band (10 MHz-25 MHz) (FIG. 43).

For each trial four quantities were calculated:
1. RMS power in the time domain
2. Total power in the low frequency band
3. Total power in the mid frequency band
4. Total power in the high frequency band all of which are recorded in units of dBmW.

Before either of the alignment tests was completed, an attachment cycling test was completed to measure the amount of variation seen in the recorded quantities on a consistent point of alignment. Using calipers to ensure proper alignment, ten separate trials were completed at (0,0), defined as a 0 mm offset axially, and a 0 degree offset radially. Between each test, contact between the transducer and vessel was severed and then reestablished. Table 1, below, summarizes the results of this consistency test. The most important value with regard to this study is the RMS power in the time domain, as that is primary criteria for detecting symbols in both communication schemes discussed above. It can be seen that while maintaining the same position on the vessel an average of approximately 8 dBmW was observed with a standard variation of 0.11 dBmW. This variation seen in this test can all be attributed to the change in transducer/barrier bonding. This provides a good baseline for assessing changes in transmission efficiency from alignment.

TABLE 1

Results from alignment consistency test

| Value | Average | Standard_Dev | Max | Min |
|---|---|---|---|---|
| 'RMS_Power' | 7.9957 | 0.11165 | 8.0696 | 7.6928 |
| 'Low_Band_Power' | −1.794 | 0.38231 | −1.2952 | −2.4993 |
| 'Mid_Band_Power' | 11.936 | 0.15681 | 12.038 | 11.514 |
| 'High_Band_Power' | 6.6444 | 0.013243 | 6.6674 | 6.6208 |

Radial Alignment

The selection of a cylindrical radial mode transducer for use internally was made not only to help with contact issues, but with the hope that it would help eliminate the need to worry about the radial alignment of the external transducer. The hypothesis was that the radial mode transducer acts as an array of infinitely small identical longitudinal mode transducers, and as such no change would be observed as the external transducer is moved around the circumference of the container. To test this hypothesis, measurements were taken at eight spots around the circumference of the vessel, with constant spacing of 45 degrees. In order to prevent combined error from radial and axial alignment issues, calipers were utilized to ensure the transducer maintained a 0 mm offset during the radial alignment testing. At each location, twenty individual trials were recorded and analyzed. Table 2 below presents the overall results of the radial alignment testing, while more complete data can be found in Tables 3-6.

TABLE 2

Results of radial alignment testing

| Value | Average | Standard_Dev | Max | Min |
|---|---|---|---|---|
| 'RMS_Power' | 8.0131 | 0.14078 | 8.1518 | 7.2454 |
| 'Low_Band_Power' | −6.4839 | 0.46822 | −5.4856 | −8.1883 |
| 'Mid_Band_Power' | 12.033 | 0.15586 | 12.202 | 11.026 |
| 'High_Band_Power' | 6.6448 | 0.19249 | 6.78 | 5.0116 |

TABLE 3

RMS power measurements for radial alignment tests

| Position | Average | Standard_Dev | Max | Min |
|---|---|---|---|---|
| 0 | 8.0253 | 0.053432 | 8.1219 | 7.8698 |
| 45 | 8.0502 | 0.046078 | 8.1222 | 7.9499 |
| 90 | 7.9782 | 0.18995 | 8.1076 | 7.2645 |
| 135 | 8.0032 | 0.16148 | 8.1092 | 7.3541 |
| 180 | 7.968 | 0.21004 | 8.1106 | 7.2454 |
| 225 | 8.0364 | 0.055381 | 8.1219 | 7.8948 |
| 270 | 8.0605 | 0.045148 | 8.135 | 7.9765 |
| 315 | 7.9827 | 0.20109 | 8.1518 | 7.2647 |

TABLE 4

Low Band Power measurements for radial alignment tests

| Position | Average | Standard_Dev | Max | Min |
|---|---|---|---|---|
| 0 | −6.476 | 0.33622 | −5.7938 | −7.0763 |
| 45 | −6.6448 | 0.50864 | −5.8794 | −7.7515 |
| 90 | −6.4678 | 0.54448 | −5.4856 | −7.4184 |
| 135 | −6.44 | 0.4344 | −5.7232 | −7.2727 |
| 180 | −6.4931 | 0.44388 | −5.7292 | −7.1234 |
| 225 | −6.4175 | 0.55697 | −5.7005 | −8.1883 |
| 270 | −6.5136 | 0.48624 | −5.6723 | −7.5012 |
| 315 | −6.4182 | 0.44068 | −5.6415 | −7.5478 |

TABLE 5

Mid Band Power measurements for radial alignment tests

| Position | Average | Standard_Dev | Max | Min |
|---|---|---|---|---|
| 0 | 12.044 | 0.062945 | 12.158 | 11.865 |
| 45 | 12.073 | 0.047186 | 12.153 | 12.002 |
| 90 | 11.992 | 0.24073 | 12.149 | 11.026 |

TABLE 5-continued

Mid Band Power measurements for radial alignment tests

| Position | Average | Standard_Dev | Max | Min |
|---|---|---|---|---|
| 135 | 12.035 | 0.11829 | 12.156 | 11.609 |
| 180 | 11.988 | 0.20158 | 12.142 | 11.418 |
| 225 | 12.052 | 0.069113 | 12.158 | 11.884 |
| 270 | 12.085 | 0.057393 | 12.18 | 11.973 |
| 315 | 11.993 | 0.25652 | 12.202 | 11.061 |

TABLE 6

High Band Power measurements for radial alignment tests

| Position | Average | Standard_Dev | Max | Min |
|---|---|---|---|---|
| 0 | 6.6636 | 0.062548 | 6.7426 | 6.4708 |
| 45 | 6.6789 | 0.069684 | 6.78 | 6.4313 |
| 90 | 6.6249 | 0.19129 | 6.7353 | 6.0036 |
| 135 | 6.5877 | 0.3724 | 6.7374 | 5.0116 |
| 180 | 6.5962 | 0.32352 | 6.7187 | 5.246 |
| 225 | 6.6822 | 0.034913 | 6.7349 | 6.6064 |
| 270 | 6.6824 | 0.01877 | 6.7145 | 6.6535 |
| 315 | 6.6423 | 0.094368 | 6.7189 | 6.3137 |

In this test, nearly identical results can be seen in all four quantities. The RMS power has the same average value with only an insignificant increase of 0.03 dBmW in standard deviation. Looking at the low band power, a significant drop can be seen in the average of nearly 5 dBmW, but the standard deviation remains relatively constant. Since the standard deviation remains constant, this drop in the average value is assumed to be the result of some shift in the test environment, i.e. a change in the stability of the test apparatus, or a change in environmental vibrations. The only indication of any change as a result of alignment is in the standard deviation of RMS power at each position.

Table 7 shows that as the distance from 0 is increased, a greater deviation in measurement is observed. While this change is insignificant in this system, it is possible that it may become an issue on cylinders with a larger radius.

TABLE 7

Average value and standard deviation for RMS power measurements at each radial alignment position

| Position | Average | Standard_Dev |
|---|---|---|
| 0 | 8.0253 | 0.053432 |
| 45 | 8.0502 | 0.046078 |
| 90 | 7.9782 | 0.18995 |
| 135 | 8.0032 | 0.16148 |
| 180 | 7.968 | 0.21004 |
| 225 | 8.0364 | 0.055381 |
| 270 | 8.0605 | 0.045148 |
| 315 | 7.9827 | 0.20109 |

Axial Alignment

To test the effects of axial misalignment, a similar testing procedure was followed. While maintaining a constant radial alignment, of 0 degrees, the axial alignment was varied in steps of 5 mm above and below the baseline. At each of the position, twenty individual trials were recorded and analyzed. Table 8 below presents the overall results of the radial alignment testing, while more complete data can be found in Tables 9-12. Random alignment data can be found in Tables 13-14.

TABLE 8

Results of axial alignment testing

| Value | Average | Standard_Dev | Max | Min |
|---|---|---|---|---|
| 'RMS_Power' | 8.259 | 0.19122 | 8.79 | 7.3258 |
| 'Low_Band_Power' | −5.124 | 0.92909 | −1.8947 | −7.7536 |
| 'Mid_Band_Power' | 12.246 | 0.23573 | 12.802 | 11.015 |
| 'High_Band_Power' | 6.9608 | 0.092891 | 7.4277 | 6.7537 |

TABLE 9

RMS power measurements for axial alignment tests

| Position | Average | Standard_Dev | Max | Min |
|---|---|---|---|---|
| −10 | 8.2629 | 0.17624 | 8.4826 | 7.8511 |
| −5 | 8.2873 | 0.1369 | 8.4614 | 7.9483 |
| 0 | 8.2743 | 0.17554 | 8.4613 | 7.8576 |
| 5 | 8.2789 | 0.18864 | 8.4544 | 7.6955 |
| 10 | 8.2915 | 0.1649 | 8.5103 | 7.8643 |
| 15 | 8.1438 | 0.33196 | 8.79 | 7.3258 |
| 20 | 8.2525 | 0.14392 | 8.4087 | 7.9425 |
| 25 | 8.2798 | 0.16299 | 8.4367 | 7.9082 |
| 30 | 8.2598 | 0.16276 | 8.4761 | 7.8923 |

TABLE 10

Low Band Power measurements for axial alignment tests

| Position | Average | Standard_Dev | Max | Min |
|---|---|---|---|---|
| −10 | −4.9018 | 0.99617 | −1.8947 | −6.0767 |
| −5 | −5.0181 | 1.0266 | −1.9291 | −6.8597 |
| 0 | −5.0684 | 1.0074 | −2.6161 | −7.0515 |
| 5 | −4.9911 | 0.95025 | −2.8621 | −6.7349 |
| 10 | −4.9473 | 0.89319 | −3.027 | −6.7935 |
| 15 | −5.227 | 0.87256 | −3.7493 | −7.7126 |
| 20 | −5.3162 | 0.87469 | −3.6142 | −7.7182 |
| 25 | −5.307 | 0.92958 | −3.5102 | −7.67 |
| 30 | −5.3389 | 0.85289 | −3.9005 | −7.7536 |

TABLE 11

Mid Band Power measurements for axial alignment tests

| Position | Average | Standard_Dev | Max | Min |
|---|---|---|---|---|
| −10 | 12.233 | 0.22133 | 12.524 | 11.662 |
| −5 | 12.269 | 0.1573 | 12.492 | 11.905 |
| 0 | 12.253 | 0.21501 | 12.496 | 11.792 |
| 5 | 12.265 | 0.22857 | 12.479 | 11.584 |
| 10 | 12.285 | 0.19332 | 12.538 | 11.799 |
| 15 | 12.104 | 0.42531 | 12.802 | 11.015 |
| 20 | 12.253 | 0.17553 | 12.454 | 11.894 |
| 25 | 12.289 | 0.19383 | 12.485 | 11.865 |
| 30 | 12.262 | 0.19557 | 12.524 | 11.839 |

TABLE 12

High Band Power measurements for axial alignment tests

| Position | Average | Standard_Dev | Max | Min |
|---|---|---|---|---|
| −10 | 7.0118 | 0.079096 | 7.1851 | 6.7826 |
| −5 | 7.0053 | 0.087096 | 7.1919 | 6.8013 |
| 0 | 7.0024 | 0.098958 | 7.1556 | 6.7864 |
| 5 | 6.9823 | 0.07752 | 7.0971 | 6.7537 |
| 10 | 6.9666 | 0.099968 | 7.2832 | 6.7849 |
| 15 | 6.9263 | 0.12987 | 7.4277 | 6.7752 |
| 20 | 6.917 | 0.062994 | 7.0597 | 6.7998 |

TABLE 12-continued

High Band Power measurements for axial alignment tests

| Position | Average | Standard_Dev | Max | Min |
|---|---|---|---|---|
| 25 | 6.9159 | 0.056414 | 6.9791 | 6.781 |
| 30 | 6.9197 | 0.05741 | 6.9846 | 6.761 |

TABLE 13

Measurements from random alignment tests

| Trial_No | VPP | Low_Band_Power | Mid_Band_Power | High_Band_Power | Total_Power |
|---|---|---|---|---|---|
| 1 | −0.1901 | −3.5675 | 11.631 | 9.017 | 13.36 |
| 2 | −0.341 | −3.3484 | 11.677 | 8.9629 | 13.378 |
| 3 | −0.53131 | −3.5286 | 11.799 | 7.9352 | 13.116 |
| 4 | −0.18781 | −3.8175 | 11.812 | 9.0874 | 13.5 |
| 5 | −0.14567 | −4.0794 | 11.794 | 9.1293 | 13.493 |
| 6 | −0.17298 | −3.9154 | 11.794 | 9.0909 | 13.483 |
| 7 | −0.15477 | −3.66 | 11.743 | 9.1035 | 13.467 |
| 8 | −0.10487 | −5.0084 | 11.832 | 9.0948 | 13.492 |
| 9 | 0.01195 | −3.9666 | 11.888 | 9.1627 | 13.563 |
| 10 | −0.026067 | −3.6988 | 11.873 | 9.1879 | 13.568 |

TABLE 14

Random alignment positions

| Trial Number | Axial Alignment (mm) | Radial Alignment (degrees) |
|---|---|---|
| 1 | −5 | 45 |
| 2 | −10 | 270 |
| 3 | 10 | 90 |
| 4 | 20 | 180 |
| 5 | 25 | 45 |
| 6 | −5 | 180 |
| 7 | 15 | 90 |
| 8 | 10 | 225 |
| 9 | −10 | 225 |
| 10 | 5 | 225 |

Once again, a slight increase in the standard variation can be seen in each of the four quantities, but this change is less than 0.1 dBmW for all quantities except the low band power. In the low frequency band, a standard deviation of nearly 1 dBmW can now be seen; however, this deviation seems to be independent of the axial alignment. Table 15 shows that the standard deviation is over 0.8 dBmW at every position, and actually reaches a maximum at the 0 mm baseline.

TABLE 15

Average value and standard deviation for low band power measurements at each axial alignment position

| Position | Average | Standard Dev |
|---|---|---|
| −10 | −4.9018 | 0.99617 |
| −5 | −5.0181 | 1.0266 |
| 0 | −5.0684 | 1.0074 |
| 5 | −4.9911 | 0.95025 |
| 10 | −4.9473 | 0.89319 |
| 15 | −5.227 | 0.87256 |
| 20 | −5.3162 | 0.87469 |
| 25 | −5.307 | 0.92958 |
| 30 | −5.3389 | 0.85289 |

Once again, this seems to indicate that there was some shift in the test environment. Since most of the power in the system is located in the mid and high bands, these variations in the low band are not important to the performance of the system. A high pass filter with a cut-off frequency in the range of 500 kHz-1 MHz would effectively eliminate the low band power, and any effects on environmental interference that may be at play in that band.

Based on the previous two alignment tests, the system appears to suffer very little loss from changes in alignment. To help confirm this conclusion, a set of random alignments was tested. Ten random positions, that included both axial and radial offsets, were selected and tested. As Table 16 below shows, the average values and standard deviations align well with the values seen for all four criteria in the attachment cycling test.

TABLE 16

Results of combined random axial and radial alignment testing

| Value | Average | Standard_Dev | Max | Min |
|---|---|---|---|---|
| 'RMS_Power' | 8.0831 | 0.091558 | 8.1852 | 7.9145 |
| 'Low_Band_Power' | −0.97394 | 0.19314 | −0.6694 | −1.3727 |
| 'Mid_Band_Power' | 12.001 | 0.12551 | 12.134 | 11.779 |
| 'High_Band_Power' | 6.7393 | 0.023805 | 6.7683 | 6.7021 |

Overall, the changes in alignment, whether axial, radial, or both, have no significant effect on the performance of the system. While some patterns correlating the change in alignment to changes in measured quantities are observed, the changes are small enough that they have a negligible effect on this system. However, as the size of the barrier changes, the effects of misalignment may reach a point where they are no longer negligible. Therefore, this testing should be completed on larger scale barriers at some point.

CONCLUSIONS

The general thrust of the invention was to develop a more robust system for through metal communication—one that considered more of the physical complications that might be encountered in an industrial environment. Specifically, the invention focuses on transmission across cylindrical metal walls, and the effects that such a barrier has on the communication system. Three primary challenges related to curved barriers were identified for study—contact, curvature, and alignment.

The first primary challenge addressed was contact. A curved barrier makes the use of commonplace longitudinal transducers, which have flat contact surfaces, impossible without some modification to the geometry of the barrier itself. To overcome contact challenges, the invention includes the following features:

The use of radial mode transducers were adopted for use internally. These curved transducers mate well with the curved barrier, and effectively eliminate any radial alignment issues.

Transducer "horns" were developed for use with externals transducers. While these horns provided no improvement in transmission efficiency, they provide a mechanical benefit, making it easier to position a transducer and hold it in place.

An EMAT was developed which allows for non-contact communication. Additionally, effective 2-way communication was demonstrated between a hybrid system involving one EMAT and one piezoelectric transducer.

The second primary challenge addressed was curvature. The high multipath nature of acoustic transmissions through metal barriers significantly limits the communication speed. The strong echoes cause significant ISI if not properly handled, which require either low data rates, or the development of echo cancellation methods. In order to communicate efficiently across cylindrical metal walls, the effect of curvature on echoes must be well understood. Using the k-wave toolbox for Matlab, two simplified acoustic simulations were completed. These simulations confirmed what was observed in the experimental results. In both cases, the echoes seen in the cylinder wall consist of a "tail" echo that is an exponentially decreasing sinusoid as opposed to discrete impulses as seen in flat barriers. Thus, the echo cancellation method needs to cancel the "tail" echo rather than discrete impulses.

The final challenge addressed was alignment. When working with cylindrical barriers, it may be difficult to guarantee proper alignment of transducers. As such it is important to understand the affect that transducer misalignment has on the system, and attempt to mitigate any negative effects in this communication scheme.

Thorough alignment testing was completed and showed that this specific system suffers only negligible performance loss as a result of both axial and radial misalignment. However, the results of the alignment testing suggest that these performance losses may not be negligible on larger scale systems.

At the completion of this study, an ultrasonic communication system was developed that effectively communicates through a 12 mm thick steel barrier with an outer radius of approximately 24 mm. A maximum data rate of 1 kbps was demonstrated, while echo analysis suggests data rates as high as 600 kbps may be achievable without the need for echo cancellation.

Recommendations for future advancements of the features described herein include:

Thorough study of acoustic waveguide design, and subsequent redesign of transducer horn.

Further analysis of echoes in cylindrical barriers with more precise simulations.

Development of a system model, and pre-distortion filter for echo cancellation.

Detailed testing of EMAT performance, including resonance analysis and testing of transmission efficiency versus distance from barrier.

Analysis and testing of system on larger cylindrical barriers, and determination of critical radius—when curvature begins to effect system performance.

Those skilled in the art also will readily appreciate that many additional modifications and scenarios are possible in the exemplary embodiment without materially departing from the novel teachings and advantages of the invention. Accordingly, any such modifications are intended to be included within the scope of this invention as defined by the following exemplary claims.

We claim:

1. A system for ultrasonic communication across a curved metal surface, comprising:

first and second acoustic transducers on opposing sides of a curved metal surface having a convex side and a concave side, said first acoustic transducer on a concave side of said curved metal surface comprising at least one curved radial mode transducer adapted to mate with the concave surface of the curved metal surface, and said second acoustic transducer on a convex side of said curved metal surface;

a transducer horn adapted to hold said second acoustic transducer in place against said convex side of said curved metal surface;

a data modulator that applies modulated data bits to one of said first and second acoustic transducers for transmission of said modulated data bits through said curved metal surface and for receipt of said modulated data bits by the other of said first and second acoustic transducers that have been transmitted through said curved metal surface; and a demodulator that demodulates the data bits received by the other of said first and second acoustic transducers.

2. A system as in claim 1, wherein said first acoustic transducer comprises a piezoelectric transducer and said second acoustic transducer comprises an electromagnetic acoustic transducer adapted to provide non-contact communication with said curved metal surface.

3. A system as in claim 2, wherein said electromagnetic acoustic transducer comprises a plurality of magnetized rings, a single axially magnetized rod, and a pancake coil between said ring and said rod.

4. A system as in claim 1, wherein the transducer horn is made of plastic.

5. A system as in claim 1, wherein the modulated data signal received by said second acoustic transducer has a sinusoidal waveform with decreasing magnitude.

6. A system as in claim 1, wherein the data modulator applies an on-off keying scheme with an impulse train to said data bits, said impulse train including a series of 5 μs impulses at a start of each data bit.

7. A system as in claim 6, wherein the on-off keying scheme comprises 56 ns impulses at an 18 MHz resonant frequency.

* * * * *